(12) United States Patent
Ishida et al.

(10) Patent No.: US 9,955,031 B2
(45) Date of Patent: Apr. 24, 2018

(54) LASER SCANNING DEVICE AND IMAGE FORMING APPARATUS INCLUDING THE SAME

(71) Applicant: KYOCERA Document Solutions Inc., Osaka-shi, Osaka (JP)

(72) Inventors: Hideki Ishida, Osaka (JP); Yuji Toyota, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days.

(21) Appl. No.: 15/331,689

(22) Filed: Oct. 21, 2016

(65) Prior Publication Data

US 2017/0118368 A1    Apr. 27, 2017

(30) Foreign Application Priority Data

Oct. 23, 2015 (JP) .................. 2015-208705

(51) Int. Cl.
| G06K 15/12 | (2006.01) |
| H04N 1/04 | (2006.01) |
| H04N 1/028 | (2006.01) |
| H04N 1/03 | (2006.01) |
| H04N 1/29 | (2006.01) |

(52) U.S. Cl.
CPC ......... *H04N 1/0283* (2013.01); *H04N 1/0281* (2013.01); *H04N 1/03* (2013.01); *H04N 1/295* (2013.01); *H04N 2201/0094* (2013.01)

(58) Field of Classification Search
CPC .. H04N 1/053; H04N 1/02409; H04N 1/0283; H04N 1/113; H04N 1/29; H04N 2201/0081

USPC .................. 358/1.7, 1.5, 296, 480
See application file for complete search history.

(56) References Cited

U.S. PATENT DOCUMENTS

| 2015/0035930 A1* | 2/2015 | Ishihara ................. B41J 2/471 347/118 |
| 2016/0156802 A1* | 6/2016 | Mizutani ................ H04N 1/113 347/258 |
| 2016/0187806 A1* | 6/2016 | Kawana ............. H04N 1/02885 399/51 |

(Continued)

FOREIGN PATENT DOCUMENTS

| JP | 07270699 A | 10/1995 |
| JP | 2006154337 A | 6/2006 |

*Primary Examiner* — Cheukfan Lee
(74) *Attorney, Agent, or Firm* — Alleman Hall Creasman & Tuttle LLP

(57) ABSTRACT

A laser scanning device includes light source, deflection portion, image forming lens, a block position setting portion, and a light source control portion. The image forming lens condenses a light beam deflected by the deflection portion on a scanned surface, and causes the light beam to be scanned on the scanned surface in a scanning direction at an equal speed. The block position setting portion sets one or more block areas which each include a plurality of section areas sectioned from each other on the scanned surface in the scanning direction. The light source control portion controls the light source to irradiate the light beam to the plurality of section areas at a plurality of irradiation timings that are determined for each of the block areas. The block position setting portion shifts set positions of the block areas along the scanning direction for each scan of at least one line.

17 Claims, 23 Drawing Sheets

(56) References Cited

U.S. PATENT DOCUMENTS

2017/0118368 A1\* 4/2017 Ishida .................. H04N 1/0283
2017/0118369 A1\* 4/2017 Ishida .................... H04N 1/053

\* cited by examiner

LASER SCANNING DEVICE AND IMAGE FORMING APPARATUS INCLUDING THE SAME

INCORPORATION BY REFERENCE

This application is based upon and claims the benefit of priority from the corresponding Japanese Patent Application No. 2015-208705 filed on Oct. 23, 2015, the entire contents of which are incorporated herein by reference.

BACKGROUND

The present disclosure relates to a laser scanning device for scanning a scanned surface with a light beam emitted from a light source, and to an image forming apparatus including a laser scanning device.

Electrophotographic image forming apparatuses include a laser scanning device configured to emit a light beam for scanning a photoconductor. The laser scanning device includes a deflector that deflects the light beam so that the deflected light beam scans a scanned surface of the photoconductor. As the deflector, there is known one using a polygon mirror having a plurality of reflection surfaces, or one using an oscillation mirror (also called a resonance mirror) such as a MEMS mirror in which a reflection surface makes a sinusoidal oscillation in a reciprocating manner to deflect the light beam. In recent years, an oscillation mirror having a small error and a small driving load has been used to realize a high-speed scanning.

In the oscillation mirror, since the reciprocating operation of the reflection surface is sinusoidally driven, the operation speed changes in synchronization with the sinusoidal waves in the oscillation range. As a result, laser scanning devices using the oscillation mirror include a curved lens having an arc sine property (hereinafter, such a curved lens is referred to as an "arc sine lens") so that the light beam moves on the scanned surface at a constant speed in the scanning direction.

The arc sine lens enables a light beam to scan the scanned surface at an equal speed, but the spot diameter (also referred to as a beam diameter) of the light beam increases as it moves away from an optical axis of the lens. In other words, as the field angle of the oscillation mirror with respect to the optical axis increases, the spot diameter of the light beam on the scanned surface increases. As a conventional technique coping with the problem, there is known a correction technique for aligning the size of the spot diameters by adjusting the amount of light at each scanning position on the scanned surface. In addition, as another conventional technique, there is known a correction technique for aligning the size of the spot diameters by decreasing the exposure time period and increasing the light intensity as the field angle of the oscillation mirror increases. It is noted that in the present specification, the spot diameter refers to a diameter of a light flux at a point where the light intensity is $1/e^2$ (=13.5%) of the peak value of the light intensity of the light beam irradiated on the scanned surface.

SUMMARY

A laser scanning device according to an aspect of the present disclosure includes a light source, a deflection portion, an image forming lens, a block position setting portion, and a light source control portion. The light source is configured to emit a light beam. The deflection portion is configured to cause the light beam emitted from the light source to scan a scanned surface one line by one line by deflecting the light beam at a predetermined deflection angle. The image forming lens is configured to condense the light beam deflected by the deflection portion on the scanned surface, and cause the light beam to be scanned on the scanned surface in a scanning direction at an equal speed. The block position setting portion is configured to set one or more block areas which each include a plurality of section areas sectioned from each other on the scanned surface in the scanning direction. The light source control portion is configured to control the light source to irradiate the light beam to the plurality of section areas at a plurality of irradiation timings that are determined for each of the block areas set by the block position setting portion. The block position setting portion shifts set positions of the block areas along the scanning direction for each scan of at least one line.

An image forming apparatus according to another aspect of the present disclosure includes the laser scanning device and an image forming portion. The image forming portion is configured to form, on a transferred sheet, an image based on an electrostatic latent image on a scanned surface scanned by the laser scanning device.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 5A shows light quantity distributions of stationary beams according to the example 1; and FIG. 5B shows control pulses used in a lighting control.

FIG. 7A shows light quantity distributions of stationary beams according to the example 2; and FIG. 7B shows control pulses used in a lighting control.

FIG. 8A shows light quantity distributions of stationary beams according to the example 3; and FIG. 8B shows control pulses used in a lighting control.

FIG. 9A shows light quantity distributions of stationary beams according to the example 4; and FIG. 9B shows control pulses used in a lighting control.

FIG. 10A shows control pulses used in a lighting control applied to the example 5; and FIG. 10B to FIG. 10D show light quantity distributions of dynamic beams according to the example 5.

FIG. 11A shows control pulses used in a lighting control applied to the example 6; and FIG. 11B to FIG. 11D show light quantity distributions of dynamic beams according to the example 6.

DETAILED DESCRIPTION

[First Embodiment]

The following describes a first embodiment of the present disclosure with reference to the attached drawings. It should be noted that the following embodiment is an example of a specific embodiment of the present disclosure and should not limit the technical scope of the present disclosure.

Figure 1:
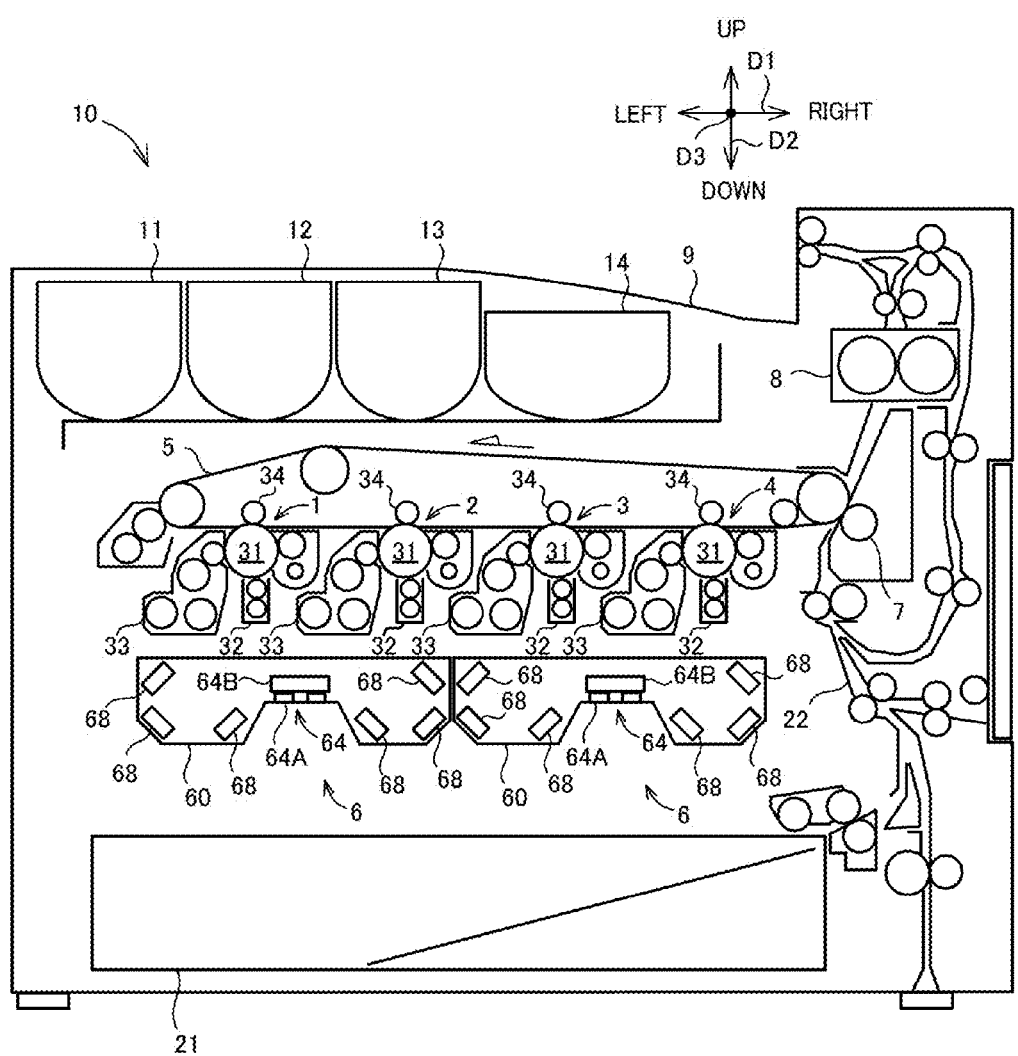
FIG. 1 is a diagram showing a configuration of an image forming apparatus according to a first embodiment of the present disclosure.

As shown in FIG. 1, an image forming apparatus 10 includes image forming units 1-4 (an example of the image forming portion), an intermediate transfer belt 5, two laser scanning devices 6, a secondary transfer roller 7, a fixing device 8, a sheet discharge tray 9, toner containers 11-14, a sheet feed cassette 21, and a conveyance path 22. The image forming apparatus 10 is a printer that forms a color or monochrome image on a sheet (an example of the transferred sheet) such as a print sheet supplied from the sheet feed cassette 21 along the conveyance path 22, and discharges the sheet onto the sheet discharge tray 9. It is noted that in the following description, a left-right direction D1, an up-down direction D2, and a front-rear direction D3 defined in the drawings may be used.

In the present embodiment, the image forming apparatus 10 includes the two laser scanning devices 6 in correspondence with the image forming units 1-4. It is noted that as another embodiment, four laser scanning devices may be provided individually respectively in correspondence with the four image forming units 1-4, or one laser scanning device may be provided in correspondence with the four image forming units 1-4. In addition, not limited to a printer, a facsimile, a copier, or a multifunction peripheral including a laser scanning device is an example of the image forming apparatus of the present disclosure.

The image forming units 1-4 form an image on a sheet based on electrostatic latent images formed on scanned surfaces (surfaces of photoconductor drums 31 described below) scanned by the laser scanning devices 6. The image forming units 1-4 are arranged in alignment along the intermediate transfer belt 5, and form a so-called tandem image forming portion. The image forming units 1-4 form toner images corresponding to Y (yellow), C (cyan), M (magenta), and K (black). The image forming units 1-4 form images by the electrophotography, and each include a photoconductor drum 31, a charging portion 32, a developing portion 33, and a primary transfer roller 34.

In each of the image forming units 1-4, after the photoconductor drums 31 are charged by the charging portions 32, electrostatic latent images corresponding to image data are formed on the photoconductor drums 31 by light beams such as laser beams emitted from the laser scanning devices 6. Thereafter, the electrostatic latent images formed on the photoconductor drums 31 are developed by the developing devices 33 by developer such as toner. The toner images formed on the photoconductor drums 31 are transferred to the intermediate transfer belt 5 by the primary transfer rollers 34 in sequence. This allows a color or monochrome image to be formed on the intermediate transfer belt 5. Subsequently, the toner image on the intermediate transfer belt 5 is transferred to the sheet by the secondary transfer roller 7, fused and fixed to the sheet by the fixing device 8. After the fixing is performed by the fixing device 8, the sheet is discharged onto the sheet discharge tray 9.

Figure 2:
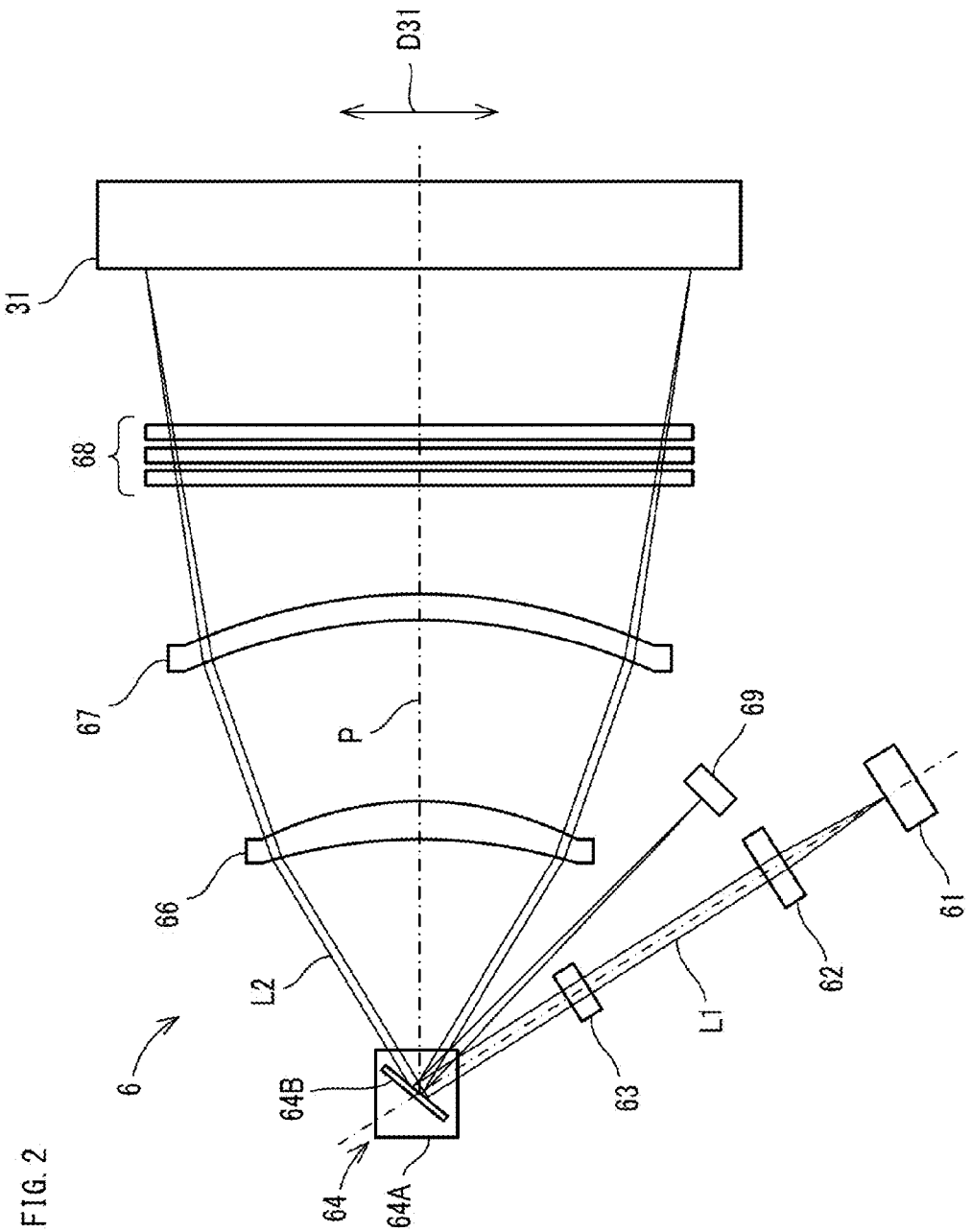
FIG. 2 is a diagram showing a configuration of a laser scanning device according to the first embodiment of the present disclosure.

Next, the laser scanning devices 6 are explained with reference to FIG. 1 and FIG. 2. It is noted that FIG. 2 shows the laser scanning devices 6 with a simplified configuration for the sake of easy understanding.

The laser scanning devices 6 emit light beams toward the photoconductor drums 31 and scan the surfaces of the photoconductor drums 31 with the light beams. This allows electrostatic latent images corresponding to the image data to be formed on the surfaces of the photoconductor drums 31. As shown in FIG. 1 and FIG. 2, the laser scanning devices 6 include light sources 61 (see FIG. 2), collimator lenses 62, cylindrical lenses 63, MEMS (Micro Electro Mechanical Systems) mirrors 64 (an example of the deflection portion), scanning lenses 66 and 67 (an example of the image forming lens), reflection mirrors 68, light detecting portions 69, and cases 60 as housings for storing these portions.

In the laser scanning devices 6, with respect to one MEMS mirror 64, two sets of light source 61, collimator lens 62, cylindrical lens 63, scanning lens 66, scanning lens 67, reflection mirror 68, and light detecting portion 69 are provided. It is noted that in FIG. 2, only one of the two sets is shown, the other omitted.

Figure 3:
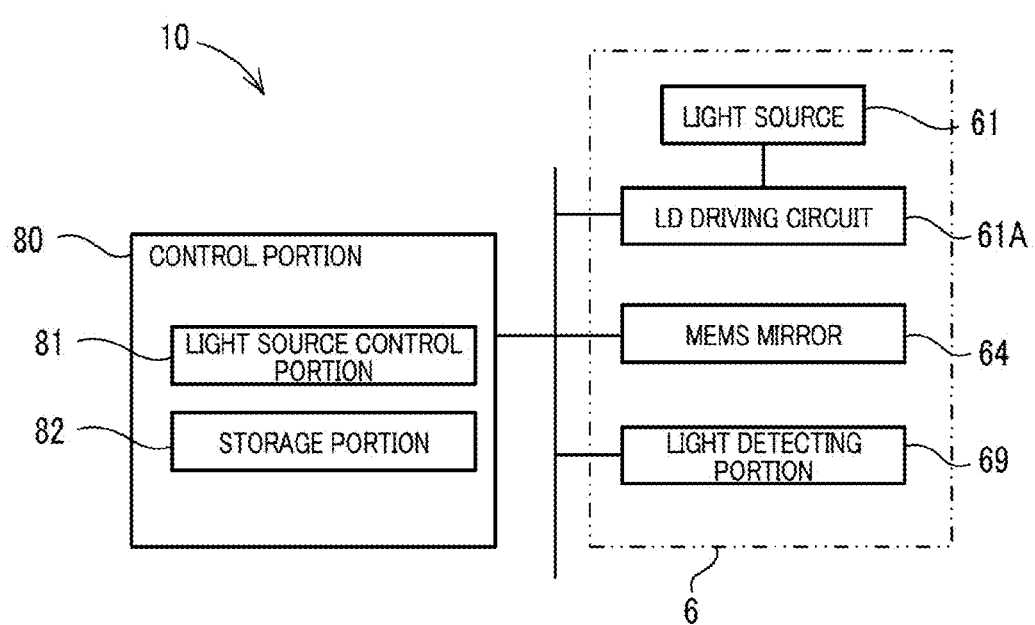
FIG. 3 is a block diagram showing a system configuration of the image forming apparatus.

Each of the light sources 61 is configured to emit a light beam such as a laser beam, and includes a semiconductor laser element and a LD driving circuit 61A that drives the semiconductor laser element (see FIG. 3). Specifically, the light source 61 is a monolithic multi-laser diode in which a plurality of light-emitting points are formed on a same substrate. The light-emitting points are arranged along a predetermined direction. In the present embodiment, the light source 61 is described as, as one example, a monolithic multi-laser diode in which two light-emitting points are arranged. Of course, the light source 61 is not limited to a multi type, but may be a single type in which a light beam is emitted from one light-emitting point.

A control portion 80 described below inputs a drive pulse signal into the LD driving circuit 61A so as to cause the light source 61 to emit light, the drive pulse signal being composed of a plurality of drive pulses. Upon receiving the drive pulse signal, the LD driving circuit 61A causes the light source 61 to emit a light beam that has a light intensity (light energy) corresponding to the received drive pulse signal. The drive pulse signal includes the drive pulses that specify a light intensity, an irradiation timing (exposure timing), and an exposure time period (lighting time period) defined for each pixel of one line of image data. The drive pulses are made respectively in correspondence with pixel areas (an example of the section areas) on the surface of the photoconductor drum 31, the pixel areas respectively corresponding to the pixels. In other words, the drive pulses define the light intensity, the irradiation timing, the exposure time period and the like for each pixel area. The LD driving circuit 61A causes the light source 61 to emit a light beam having a property corresponding to the drive pulses included in the drive pulse signal. The control portion 80, upon obtaining the gradation value (density information) of each pixel from pixel data constituting the image data input to the image forming apparatus 10, generates the drive pulse signal composed of drive pulses each having a width or an amplitude corresponding to the gradation value, and outputs the generated drive pulse signal to the LD driving circuit 61A. It is noted that the drive pulse signal to be output from the control portion 80 is corrected by the control portion 80 as described below, and the drive pulse signal after correction is output to the LD driving circuit 61A.

The light source 61 emits two light beams respectively from two light-emitting points. The two light beams emitted from the light source 61 are converted to parallel light beams by the collimator lens 62 and then enter the cylindrical lens 63 as a light flux L1 composed of the two light beams. The light flux L1 passes through the cylindrical lens 63, and enters the MEMS mirror 64. It is noted that the light flux L1 composed of the light beams emitted from the light source 61 is deflected by the MEMS mirror 64 at a predetermined angle so as to be scanned in a scanning direction (main scanning direction) and enters the scanning lens 66 located on the downstream side in the travelling direction of the light flux L1.

The MEMS mirror 64 is configured to cause the light flux L1 that was emitted from the light source 61 and passed through the cylindrical lens 63, to scan the surface (scanned surface) of the photoconductor drum 31 by deflecting the light flux L1 at a predetermined deflection angle. Hereinafter, the scanning direction of the light flux L1 scanned by the MEMS mirror 64 is referred to as a main scanning direction D31 (see FIG. 2), and a direction perpendicular to the main scanning direction D31 on the surface of the photoconductor drum 31 is referred to as a sub scanning direction. The MEMS mirror 64 is a so-called oscillation mirror that oscillates sinusoidally at the predetermined deflection angle and reflects the light flux L1 toward the surface of the photoconductor drum 31. The MEMS mirror 64 has an oscillating shaft (not shown) that is parallel to the sub scanning direction. The MEMS mirror 64 oscillates around the oscillating shaft and reciprocates within a range of a predetermined deflection angle so as to deflect and scan the light flux L1 incident from the cylindrical lens 63. The light reflected by the MEMS mirror 64 travels to the scanning lens 66 as a light flux L2.

The MEMS mirror 64 is configured to be oscillationally driven by the sinusoidal oscillation, and includes a MEMS substrate 64A and a reflection mirror 64B. The MEMS substrate 64A is a device in which mechanical elements such as an actuator and an electromagnetic coil, and electronic devices such as an electronic circuit are integrally integrated on a semiconductor substrate. For example, when a sinusoidal voltage of a predetermined frequency is applied to the electromagnetic coil, the electromagnetic coil is operated by the sinusoidal voltage, and thereby the reflection mirror 64B oscillates around the oscillating shaft within a range of the predetermined deflection angle. It is noted that although the MEMS mirror 64 is adopted in the present embodiment, the MEMS mirror 64 may be replaced with another oscillation mirror such as a galvano mirror as far as it is a deflector that is oscillationally driven by the sinusoidal oscillation.

The scanning lenses 66 and 67 condenses the light flux L2 that has been reflected and scanned in the main scanning direction D31 by the MEMS mirror 64, on the scanned surface, namely the surface of the photoconductor drum 31. That is, the scanning lenses 66 and 67 form an image of the light flux L2 that is scanned by the MEMS mirror 64 in the main scanning direction D31, on the surface of the photoconductor drum 31. In addition, the scanning lenses 66 and 67 cause the light flux L2 to be scanned on the surface of the photoconductor drum 31 in the main scanning direction D31 at an equal speed, and are, specifically, arc sine lenses having an arc sine property.

Each of the reflection mirrors 68 is a reflection member that is elongated in the main scanning direction D31 in which the light flux L2 is scanned by the MEMS mirror 64. The reflection mirrors 68, in sequence, reflect the light flux L2 that has passed through the scanning lenses 66 and 67, and guide the light flux L2 to the surface of the photoconductor drum 31.

The light detecting portions 69 are provided in the cases 60. The light detecting portions 69 are provided respectively in correspondence with the image forming units 1-4, and are disposed at predetermined positions on the scanning path of the light flux L2 scanned in the main scanning direction D31 by the MEMS mirror 64. In the present embodiment, the light detecting portions 69 are disposed outside the range of the scanning lenses 66 and 67. Each of the light detecting portions 69 detects an incidence of the light flux L2. The light detecting portion 69 includes a photo IC and a substrate on which the photo IC is implemented, the photo IC being, for example, a transistor. Upon detecting the light flux L2, the light detecting portion 69 outputs a beam detect signal (also called a BD signal or a main scanning sync signal) to the control portion 80 described below, the beam detect signal being used to take timing of the scanning start for each line. In the image forming apparatus 10, the control portion 80 controls an emission start timing of a light beam corresponding to each line of image data, namely a writing timing of each line of image data, based on the detection timing of the light flux L2 by the light detecting portion 69. It is noted that the light detecting portion 69 may be disposed on both sides of the deflection angle of the MEMS mirror 64. In addition, in the image forming apparatus 10, the light detecting portion 69 may be provided in one of the image forming units 1-4. Furthermore, in the image forming apparatus 10, one light detecting portion 69 may be provided in correspondence with the image forming units 1 and 2, and one light detecting portion 69 may be provided in correspondence with the image forming units 3 and 4.

Meanwhile, it is known that when arc sine lenses are used as the scanning lenses 66 and 67 to make constant the scanning speed of the light flux L2 on the surface (scanned surface) of the photoconductor drum 31, the spot diameter of the light beam increases as it moves away from an optical axis P of the lens. In other words, as the field angle of the MEMS mirror 64 with respect to the optical axis P increases, the spot diameter of the light beam on the surface of the photoconductor drum 31 increases. In this case, for example, when light beams of the same light energy are respectively emitted toward the center and two ends of the photoconductor drum 31 in the longitudinal direction thereof, the spot diameters at the respective irradiation positions are different. Thus the electrostatic latent image on the surface of the photoconductor drum 31 has different potentials at the respective irradiation positions. This causes a problem that even if the same images are formed on a sheet by the image forming apparatus 10 at the center and two ends in the width direction thereof, the images may be different from each other in density, or may have a density unevenness.

It is noted that as a conventional technique, there is known a correction technique for aligning the size of the spot diameters by adjusting the amount of light at each scanning position on the scanned surface. In addition, as another conventional technique, there is known a correction technique for aligning the size of the spot diameters by decreasing the exposure time period and increasing the light intensity as the field angle of the MEMS mirror 64 increases. However, according to the former conventional technique, an image density unevenness occurs in the main scanning direction since the irradiated light beams have different light energies at the respective scanning positions on the scanned surface. On the other hand, according to the latter conventional technique, it is possible to approximate the light quantity distributions (beam profiles) of the light beams at the respective scanning positions in the scanning direction, and make approximately equal the light energies at the respective scanning positions. However, according to the latter conventional technique, the light beam is irradiated by one lighting onto a predetermined irradiation area on the scanned surface. As a result, as a difference from a correction-target spot diameter increases, the adjustment widths of the exposure time period (lighting time period) and the light intensity with respect to a difference in field angle (or a difference in distance from the optical axis) increase. Since it is impossible to correct the spot diameter by exceeding a limit of the exposure time period or the light intensity, the latter conventional technique may not be able to sufficiently correct the spot diameter when the difference between spot diameters is large. In recent years, image forming apparatuses that can form images on sheets of relatively large sizes (for example, A3 size) are much in demand. In such image forming apparatuses, when the correction range of the spot diameter is large, an image density unevenness formed at end portions in the width direction of the sheet may not be eliminated.

In the image forming apparatus 10 of the present embodiment, as described below, the control portion 80 irradiates light beams on a plurality of irradiation areas in the pixel area on the surface of the photoconductor drum 31 corresponding to one pixel, at a plurality of irradiation timings. With this configuration, it is possible to make approximately equal the light quantity distributions in the pixel areas located on the surface of the photoconductor drum 31 in the main scanning direction D31, and make approximately align the size of the spot diameters of the light fluxes in the pixel areas. In particular, in the present embodiment, with the configuration where the light beams emitted at a plurality of irradiation timings are irradiated on a plurality of irradiation areas in the pixel areas sectioned from each other in correspondence with the pixels, it is possible to increase, in the pixel areas, the correction range of the spot diameter of the light flux which includes a plurality of light beams.

Specifically, as shown in FIG. 3, the image forming apparatus 10 includes the control portion 80 which is configured to control the image formation operation in the image forming apparatus 10. It is noted that the control portion 80 may be a main control portion configured to comprehensively control the whole image forming apparatus 10, or may be provided independent of the main control portion. The control portion 80 is connected to the LD driving circuit 61A, the MEMS mirror 64, the light detecting portion 69, and the like. The LD driving circuit 61A is a driver circuit for performing a lighting control (exposure control) of the light source 61, and controls the exposure (lighting and extinction) of the light source 61 in response to the drive pulse signal from the control portion 80. In addition, the LD driving circuit 61A modifies, or more specifically varies the intensity or the wavelength of the light beam emitted from the light source 61 in response to the drive pulse signal.

The control portion 80 includes a CPU, a ROM, and a RAM. In addition, the control portion 80 includes a light source control portion 81 and a storage portion 82. Specifically, the control portion 80 functions as the light source control portion 81 when it causes the CPU to execute a process in accordance with a control program stored in the ROM or the like. In addition, the storage portion 82 is a storage medium such as a flash memory. It is noted that the light source control portion 81 may be composed of an integrated circuit.

The light source control portion 81 controls the light source 61 to irradiate, at a plurality of irradiation timings, a light beam to predetermined irradiation positions in at least one pixel area among a plurality of pixel areas on the surface of the photoconductor drum 31, the plurality of pixel areas being sectioned from each other in the main scanning direction D31 in correspondence with a plurality of pixels. The plurality of irradiation timings are determined based on the position of the at least one pixel area in the main scanning direction D31. The light source control portion 81 may control the light source 61 to irradiate, at the plurality of irradiation timings, a light beam to the predetermined irradiation positions in all of the plurality of pixel areas. The plurality of irradiation timings are calculated in advance based on a simulation or measured data, and stored in the storage portion 82. Alternatively, each time a line is scanned, a reference spot diameter of each pixel area may be read from beam data that is described below, and the plurality of irradiation timings may be calculated based on the reference spot diameter. It is noted that the reference spot diameter is described below.

It is noted here that each pixel area corresponds to each pixel which is the smallest unit of an image formed on a sheet by the image forming units 1-4. For example, when the image has a resolution of 600 dpi, the width of a pixel is approximately 42.3 μm. A pixel area corresponding to this pixel is represented as a pixel area R10 in an example 1 described below, the pixel area R10 being shown in FIG. 5A and FIG. 5B. The pixel areas in this case are areas on the surface of the photoconductor drum 31 that are sectioned from each other at intervals of 42.3 μm in the main scanning direction D31. The pixel areas are an example of the section areas of the present disclosure. However, the section areas are not limited to the areas that respectively correspond to the pixels. For example, each section area may correspond to two or three pixels, or may be one of a plurality of small areas that are formed by further sectioning an area corresponding to a pixel.

In the present embodiment, the plurality of irradiation timings are determined such that the light quantity distributions of light fluxes in the pixel areas on the surface of the photoconductor drum 31 are approximately equal over the whole region in the main scanning direction D31. When the light quantity distributions are equal, the spot diameters of the light fluxes each composed of one or more light beams irradiated to the pixel areas are approximately equal over the whole region in the main scanning direction D31. In other words, the plurality of irradiation positions to which the light beams are irradiated at the plurality of irradiation timings are determined such that the spot diameters of the light fluxes of a plurality of light beams irradiated to the pixel areas are approximately equal over the whole region in the main scanning direction D31. In the example 1 described below, control pulses A11 to A13 are determined such that the spot diameters of the light fluxes in the pixel areas R10 (see FIG. 5A to 5C) have an approximately equal size (=90.0 μm) over the whole region in the main scanning direction D31, wherein the control pulses A11 to A13 respectively correspond to three irradiation positions (irradiation areas) that are located at equal intervals in the main scanning direction D31 in each pixel area R10. The control pulses A11 to A13 are control signals for driving the light source 61. The light source control portion 81 controls the lighting of the light source 61 by outputting the control pulses A11 to A13 to the LD driving circuit 61A, wherein the control pulses A11 to A13 respectively correspond to the plurality of irradiation timings. The width of each of the control pulses A11 to A13 is determined such that the light beam is irradiated for a predetermined exposure time period. In addition, the irradiation timings of the control pulses A11 to A13 are determined such that the light beam is irradiated to the three irradiation positions in the pixel area R10 at a predetermined interval.

The light source control portion 81 drivingly controls the light source 61 such that a light beam is irradiated to a plurality of irradiation positions (irradiation areas) located in the pixel area, at a plurality of irradiation timings. In the present embodiment, the light source control portion 81 drivingly controls the light source 61 such that a light beam of an exposure time period (lighting time period) and a light intensity that correspond to the position of the pixel area in the main scanning direction D31, is irradiated to the irradiation positions at the irradiation timings. Specifically, as described above, drive pulse signals are generated, wherein each drive pulse signal includes a drive pulse whose width corresponds to the gradation value (density information) of each pixel included in each piece of pixel data that constitutes the image data. Thereafter, the generated drive pulse signals are corrected to include drive pulses (control pulses) that represent the irradiation timings corresponding to the plurality of irradiation positions, the exposure time period, and the light intensity. The light source control portion 81 outputs the corrected drive pulse signals to the LD driving circuit 61A, and the LD driving circuit 61A causes the light source 61 to emit light beams in accordance with the drive pulse signals. In the example 1 described below, with respect to all of the control pulses A11 to A13, the irradiation timings are determined such that light beams of the same light intensity (5.25 mW) are emitted from the light source 61. In addition, with respect to all of the control pulses A11 to A13, the irradiation timings are determined such that light beams of the same light intensity (5.25 mW) are emitted from the light source 61. In addition, with respect to the control pulse A12 located at the center of the pixel area R10, the width thereof is determined so as to have an exposure time period twice that of the other control pulses A13 and A14 located on both sides of the control pulse A12. The light source 61 is drivingly controlled by drive pulse signals including the control pulses that have been determined in this way.

The storage portion 82 stores beam data for each of a plurality of pixel areas sectioned from each other in the main scanning direction D31, each piece of the beam data corresponding to the position of each pixel area in the main scanning direction D31. The beam data includes a spot diameter (hereinafter referred to as a "reference spot diameter") that appears in a pixel area when a reference light beam having a predetermined light energy is irradiated to the pixel area for a predetermined time period. The reference spot diameter is a spot diameter of the reference light beam that appears by only one irradiation of the reference light beam to the pixel area. Specifically, the reference light beam is a so-called stationary beam that is emitted, but is not scanned. In addition, the reference spot diameter is a spot diameter of the reference light beam that appears when the reference light beam is irradiated individually to the plurality of pixel areas. The reference spot diameters can be obtained in advance from a simulation or measured data. Such beam data is obtained in advance and stored in the storage portion 82. As a result, the light source control portion 81 can recognize, from the beam data, the variation of the reference spot diameters in the pixel areas. For example, the reference light beam of a predetermined light intensity is irradiated to each of the pixel areas for a predetermined time period, and then the light quantity distributions of the reference light beam (the light quantity distributions in the pixel areas) and the spot diameters are measured, and the measured values are stored in the storage portion 82 in correspondence with the pixel areas. The beam data may include, in addition to values of the light quantity distribution and the reference spot diameter, the property of the light beam emitted from the light source 61. Specifically, the property of the light beam may be: the size of the main lobe included in the light beam; presence/absence of a side lobe; the light energy of the main lobe; and/or the light energy of the whole light beam. In the present embodiment, the control portion 80 determines the irradiation timings of the plurality of drive pulses corresponding to the pixel areas, based on the positions of the pixel areas in the main scanning direction D31, and the reference spot diameters included in the beam data.

In the present embodiment, the light source control portion 81 adjusts the intervals between the plurality of irradiation timings of the light beam with respect to the pixel areas so that there exists a negative correlation between the intervals and the sizes of the reference spot diameters. In an example 4 described below, the smaller the spot diameter of the stationary beam is, the larger the interval between control pulses corresponding to the outer irradiation positions in the main scanning direction D31 is; and the larger the spot diameter of the stationary beam is, the smaller the interval between control pulses corresponding to the outer irradiation positions in the main scanning direction D31 is.

In the following, a description is given of an example of the procedure of a drive control process of the light source 61 executed by the control portion 80. The drive control process is executed in parallel to the image forming process when, for example, a print job is received from an an external information processing apparatus such as a personal computer.

In step S11, the control portion 80 determines whether or not a scanning start instruction to start a scanning by the laser scanning devices 6 has been input. In the present embodiment, the control portion 80 determines that a scanning start instruction has been input when a print job has been input to the image forming apparatus 10 together with an image print instruction. When it is determined that a scanning start instruction has been input, the process moves to step S12 in which the control portion 80 drives the MEMS mirror 64.

In the subsequent step S13, the light source control portion 81 of the control portion 80 generates drive pulse signals based on the density of the pixels on one scanning line. Specifically, the light source control portion 81 obtains, from image data input together with the print job, gradation values (density information) of the pixels included in a plurality of pieces of pixel data constituting the image data, and generates drive pulse signals including drive pulses whose widths correspond to gradation values. The drive pulse signals include one line of image information (density information) that corresponds to one scanning line. Specifically, the drive pulse signals each include a drive pulses that indicates the exposure time period and the light intensity determined for each pixel area in one line. At this stage, each drive pulse is a single pulse that allows one exposure to be performed for one pixel area, and functions to form a pixel of an electrostatic latent image on the surface of the photoconductor drum 31 by one exposure by the drive pulse. In the present embodiment, a single drive pulse assigned to a single pixel is divided into a plurality of drive pulses (control pulses) so that a light beam is irradiated a plurality of times to a single pixel area.

Specifically, in the subsequent step S14, the light source control portion 81 performs a correction process of correcting the drive pulse signals generated in step S13. In the correction process, the drive pulse assigned to each pixel area is divided into a plurality of drive pulses so that the light beam is irradiated to each pixel area at a plurality of irradiation timings that have been determined in correspondence with each pixel area. For example, in the case where three irradiation timings have been determined with respect to a pixel area, the drive pulse is divided into three drive pulses. Hereinafter, the plurality of drive pulses generated by dividing one drive pulse are referred to as control pulses. In the example 1 described below, in the correction process, the drive pulse is divided into three control pulses A11 to A13 (see FIG. 5B) that are applied to a stationary beam 101.

The interval between the control pulses is determined such that it becomes the interval between the irradiation timings at which the light beam is irradiated. In addition, the pulse width of the control pulses correspond to the exposure time period for which the light beam is irradiated. As a result, the pulse width of the control pulses is determined so that sufficient light intensities can be obtained at the irradiation positions in the pixel area. In addition, the amplitude of the control pulses may be adjusted so that sufficient light intensities can be obtained at the irradiation positions. The number of divisions from a drive pulse, the interval between the control pulses, and the amplitude of the control pulses are determined for each pixel area by referring to the information (also referred to as correction information) such as the reference spot diameters and the property of the light beam (the light quantity distribution and the like) stored in the storage portion 82 in correspondence with each of the pixel areas. For example, the number of divisions from a drive pulse and the interval may be determined such that the spot diameter of the light flux irradiated in the pixel area matches an average diameter of the reference spot diameters stored in the storage portion 82. Of course, in the case where the modulation rate and the number of divisions that allow the spot diameter to match the average diameter have been obtained for each pixel area by a simulation, the correction process of dividing the drive pulse may be performed based on the modulation rate and the number of divisions (also referred to as "correction information").

In the subsequent step S15, the control portion 80 determines whether or not a DB signal has been detected from the light detecting portion 69. When it is determined that a DB signal has been detected, the process moves to step S16, in which the light source control portion 81 of the control portion 80 outputs the drive pulse signals that have been corrected in the correction process, to the LD driving circuit 61A. Upon receiving the drive pulse signals, the LD driving circuit 61A drivingly controls the light source 61 in accordance with the drive pulse signals. This causes the light beam to be irradiated to a plurality of irradiation positions (irradiation areas) in each pixel area on the surface of the photoconductor drum 31, at a plurality of irradiation timings determined for each pixel area. It is noted that when the next line needs to be scanned, the processes after step S13 are repeated, and when the next line does not need to be scanned, the MEMS mirror 64 is stopped to be driven, and the series of processes ends.

With the above-described driving control process of the light source 61 performed during the scanning by the laser scanning devices 6 of the image forming apparatus 10, the light beam is irradiated to a plurality of irradiation positions (irradiation areas) in each pixel area on the surface of the photoconductor drum 31, at a plurality of irradiation timings determined for each pixel area. As a result, it is possible to make approximately equal the light quantity distributions in the pixel areas, and approximately align the size of the spot diameters of the light fluxes in the pixel areas.

It is noted that, according to the present embodiment, as one example, each of generated drive pulse signals is corrected to a new drive pulse that includes control pulses. However, not limited to this, for example, in step S13, the light source control portion 81 may generate drive pulse signals which each include control pulses.

EXAMPLES 1 TO 8

Next, a description is given of examples 1 to 8 of the first embodiment of the present disclosure. In the following, the examples 1 to 8 are described with reference to FIG. 5A to FIG. 12B that show results of simulations performed with use of certain simulation programs.

Example 1

Figure 5A:
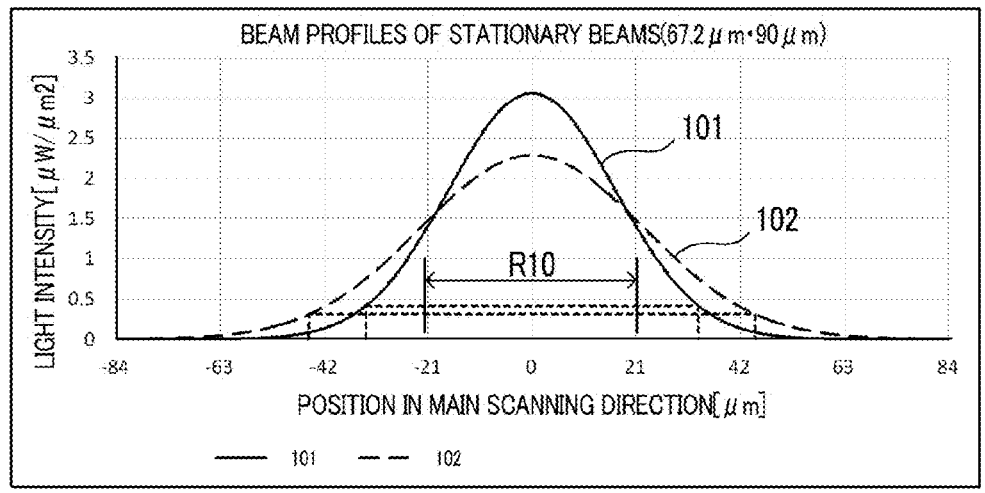
FIG. 5A and FIG. 5B are diagrams for explaining an example 1 of a first embodiment of the present disclosure.
Figure 5B:
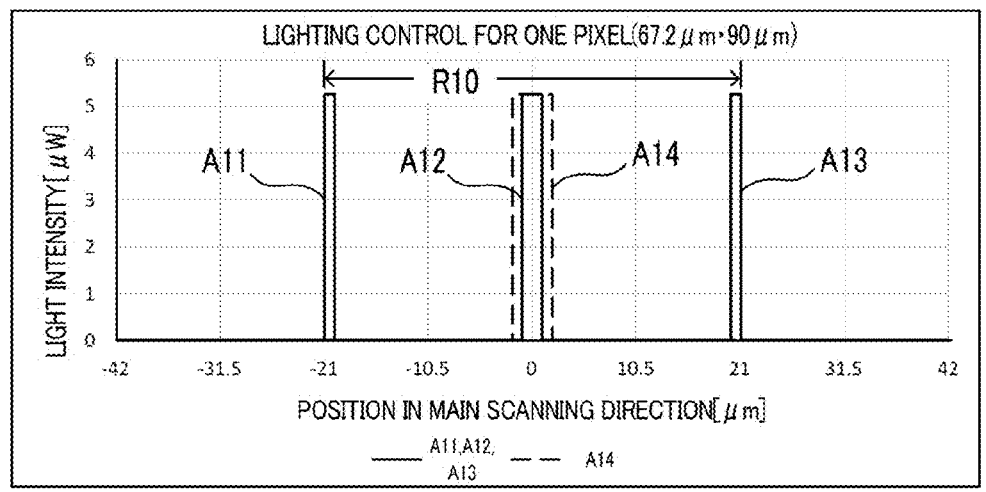
Figure 6A:
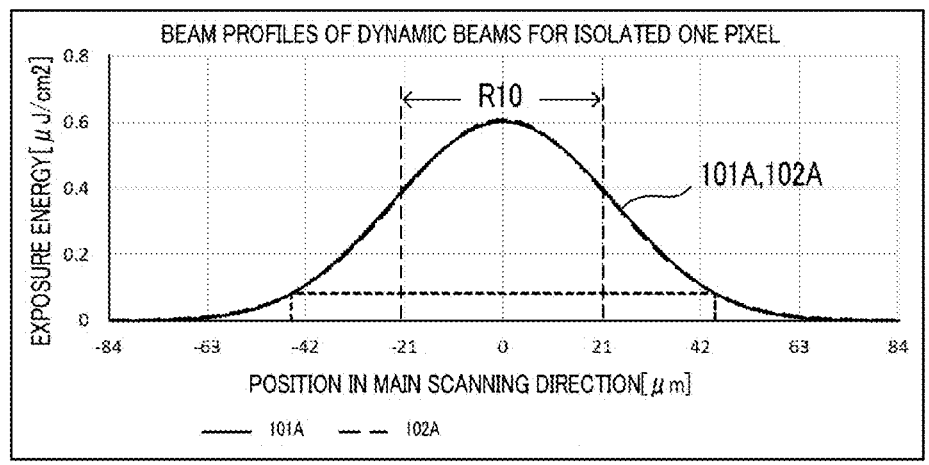
FIG. 6A to FIG. 6C are diagrams for explaining the example 1 of the first embodiment of the present disclosure, and show light quantity distributions of dynamic beams according to the example 1.
Figure 6B:
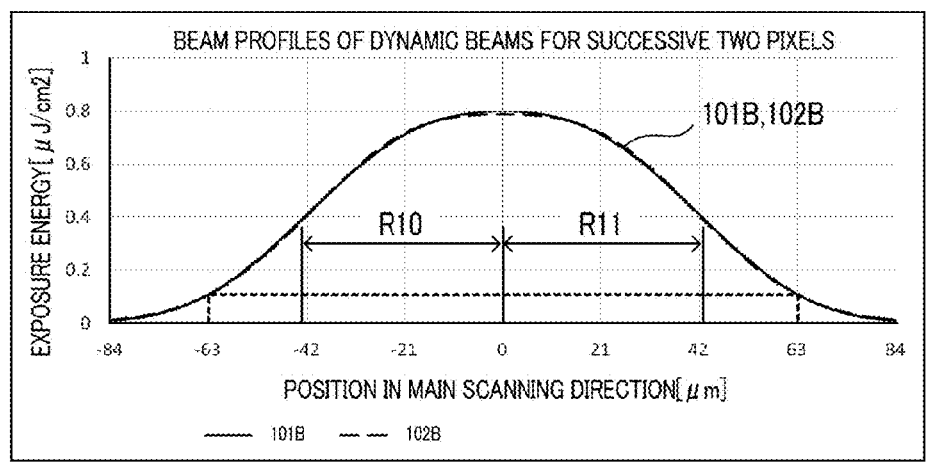
Figure 6C:
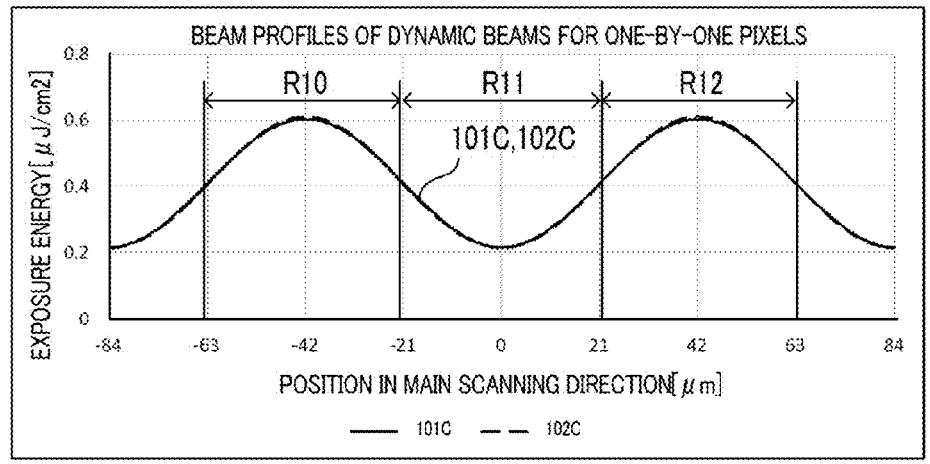

The example 1 (simulation 1) is described with reference to FIG. 5A to FIG. 6C. FIG. 5A shows a light quantity distribution obtained by performing a simulation in which stationary beams 101 and 102 of different spot diameters were irradiated to the pixel area R10 for a predetermined time period ($2.80 \times 10^{-8}$ s), the pixel area R10 corresponding to a pixel in an image having a resolution of 600 dpi. FIG. 5B shows control pulses A11 to A13 for the lighting control applied to the stationary beam 101, and a control pulse A14 for the lighting control applied to the stationary beam 102 in the simulation of the example 1. In addition, FIG. 6A to FIG. 6C are diagrams showing the simulation results, namely, dynamic beams 103, 104 and 105 obtained when three light beams were irradiated by driving the light source 61 by the control pulses shown in FIG. 5B. Here, a stationary beam is a light beam emitted to a scanned surface without being scanned. In addition, a dynamic beam is a light flux obtained on a scanned surface by scanning the scanned surface with a light beam.

In the example 1, the stationary beam 101 is a light beam whose spot diameter is set to 67.2 μm, and the stationary beam 102 is a light beam whose spot diameter is set to 90.0 μm. Here, the spot diameter refers to a diameter of a light flux at a point where the light intensity is $1/e^2$ (=13.5%) of the peak value of the light intensity. As will be understood from FIG. 5A, the light quantity distribution changes as the spot diameter changes. In the example 1, a simulation was performed with respect to the stationary beam 101 and the stationary beam 102 that have different spot diameters and different light quantity distributions, by performing a lighting control using the control pulses shown in FIG. 5B so that the spot diameter of the stationary beam 101 was changed from 67.2 μm to 90.0 μm that was the spot diameter of the stationary beam 102, namely for alignment of the size of the spot diameters. Here, the simulation conditions for FIG. 5B were: the light intensity (light energy) of each control pulse was 5.25 mW, the scanning speed was 1500 m/s, the exposure time period of the control pulses A11 and A13 was $6.67 \times 10^{-10}$ s, the exposure time period of the control pulse A12 was $1.33 \times 10^{-9}$ s, the exposure time period of the control pulse A14 was $2.67 \times 10^{-9}$ s, the scan length during the lighting of the control pulses A11 and A13 was 1 μm, the scan length during the lighting of the control pulse A12 was 2 μm, the scan length during the lighting of the control pulse A14 was 4 μm, the light energy (exposure energy) of the control pulses A11 to A13 was 0.393701 μJ/cm², and the light energy (exposure energy) of the control pulse A14 was 0.787402 μJ/cm².

In the example 1, as shown in FIG. 5B, in the pixel area R10, with regard to the stationary beam 101 having a small spot diameter, three irradiation positions, namely, the center and two ends in the main scanning direction D31, were determined, and the control pulses A11 to A13 corresponding to the irradiation positions were used. That is, light beams of the control pulses A11 to A13 were irradiated to the pixel area R10 at three irradiation timings. In addition, the irradiation timings of the three control pulses A11 to A13 were determined to have equal intervals in the main scanning direction D31. That is, in the pixel area R10, the irradiation timings and the irradiation positions of light beams of the control pulses A11 to A13 have equal intervals. In addition, with regard to the stationary beam 101, the irradiation timing of the control pulse A12 was determined to correspond to the center position in the main scanning direction D31, and the irradiation timings of the other two control pulses A11 and A13 were determined so that light beams were irradiated to the irradiation positions that are located symmetrical with respect to the center position in the main scanning direction D31. That is, the irradiation positions of light beams irradiated at a plurality of irradiation timings by the control pulses A11 and A13 were located to be symmetrical with respect to the center position in the main scanning direction D31. Specifically, the irradiation positions of the control pulses A11 and A13 were determined to be the outermost positions (boundaries with adjacent pixel areas) in the pixel area R10 in the main scanning direction D31. In addition, with regard to the stationary beam 102 that has a large spot diameter, the irradiation timing of one control pulse (the control pulse A14) was determined to correspond to the center position so that the light intensity was concentrated at the center position in the main scanning direction D31. That is, the irradiation position of the light beam irradiated by the control pulse A14 was the center position.

The control pulses A11 to A13 and the control pulse A14 had the same light intensity, while the exposure time period of the control pulse A12 was twice those of the control pulses A11 and A13 at the opposite ends. In addition, the exposure time period of the control pulse A14 was twice that of the control pulse A12, and was quadruple those of the control pulses A11 and A13. That is, the exposure time periods were set such that, in the pixel area R10, a light beam having a larger light energy was irradiated to the irradiation position (inner irradiation position) located inner than irradiation positions (outer irradiation positions) that are located outermost in the main scanning direction D31. Specifically, in the case of the control pulses A11 to A13, the inner control pulse A12 irradiates a light beam having a light energy twice those of light beams irradiated by the outer control pulses A11 and A13.

FIG. 6A shows light quantity distributions of the dynamic beams 101A and 102A obtained when the lighting control shown in FIG. 5B was performed on the stationary beam 101 and the stationary beam 102 that have different profiles, and light beams were scanned to the pixel area R10. The dynamic beams 101A and 102A had an aligned size of spot diameter, 90.0 μm, and the same light quantity distribution on both the stationary beam 101 and the stationary beam 102. It is noted that in FIG. 6A, since the light quantity distributions match each other, the dynamic beams 101A and 102A overlap each other. This also applies to FIG. 6B and FIG. 6C.

FIG. 6B shows light quantity distributions of dynamic beams 101B and 102B obtained when the lighting control shown in FIG. 5B was performed on pixel areas R10 and R11 that correspond to two successive pixels, and light beams were scanned to the pixel areas R10 and R11. FIG. 6C shows light quantity distributions of dynamic beams 101C and 102C obtained when the lighting control shown in FIG. 5B was performed on pixel areas R10 to R12 that correspond to one-by-one pixels, and light beams were scanned to the pixel areas R10 to R12. Here, the one-by-one pixels indicate pixels in a lighting pattern in which the lighting (ON) and non-lighting (OFF) are alternately repeated for each of the pixels. As shown in FIG. 6B and FIG. 6C, the dynamic beams have the same light quantity distribution with respect to each of the stationary beam 101 and the stationary beam 102. As a result, the spot diameters at a point where the light intensity is $1/e^2$ of the peak value of the light intensity in the light quantity distribution, are aligned to the same size.

It is understood from the above that, by applying the lighting control shown in FIG. 5B, it is possible to make approximately equal the light quantity distributions of light beams and approximately align the size of the spot diameters of light beams even when the maximum difference between spot diameters is 22.8 (=90.0–67.2) μm in the main scanning direction D31. In addition, as shown in FIG. 5B, although a light intensity twice those of the stationary beams 101 and 102 is required, it is possible to make equal the light quantity distributions and align the size of the spot diameters only by an adjustment of light intensity approximately twice as much. As a result, it is possible to correct the spot diameters with a less adjustment width than conventional technologies, and in a range that is equal to or wider that that of conventional technologies. In other words, it is possible to widen the correction range of the spot diameter, compared to conventional technologies.

It is noted that in the example 1, it has been confirmed that it is possible to make equal the light quantity distributions and align the size of the spot diameters by setting the spot diameters of the stationary beam 101 and the stationary beam 102 to 75.0 μm and 95.6 μm, respectively, and performing a simulation so that the spot diameter of the stationary beam 101 was changed from 75.0 μm to 95.6 μm that was the spot diameter of the stationary beam 102 to align the size of the spot diameters.

Example 2

Figure 7A:
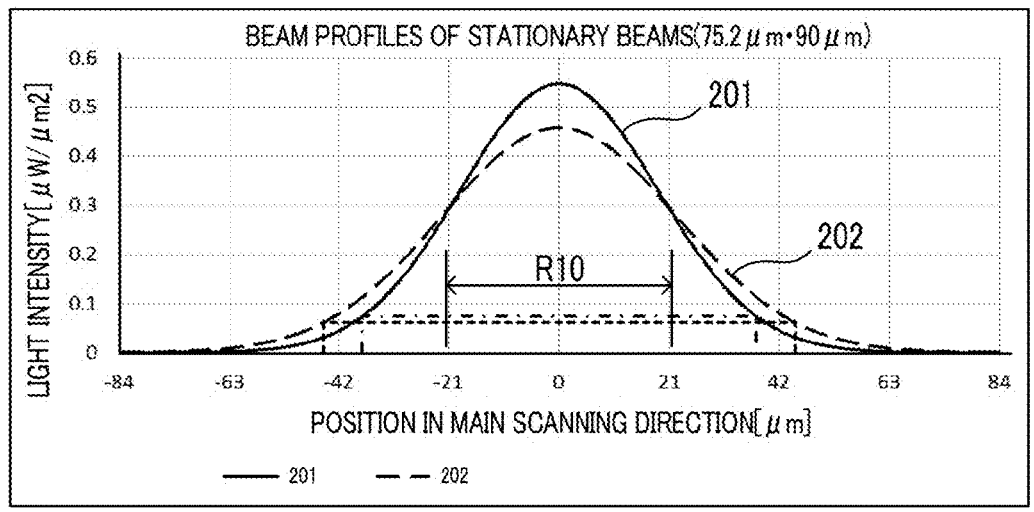
FIG. 7A and FIG. 7B are diagrams for explaining an example 2 of the first embodiment of the present disclosure.
Figure 7B:
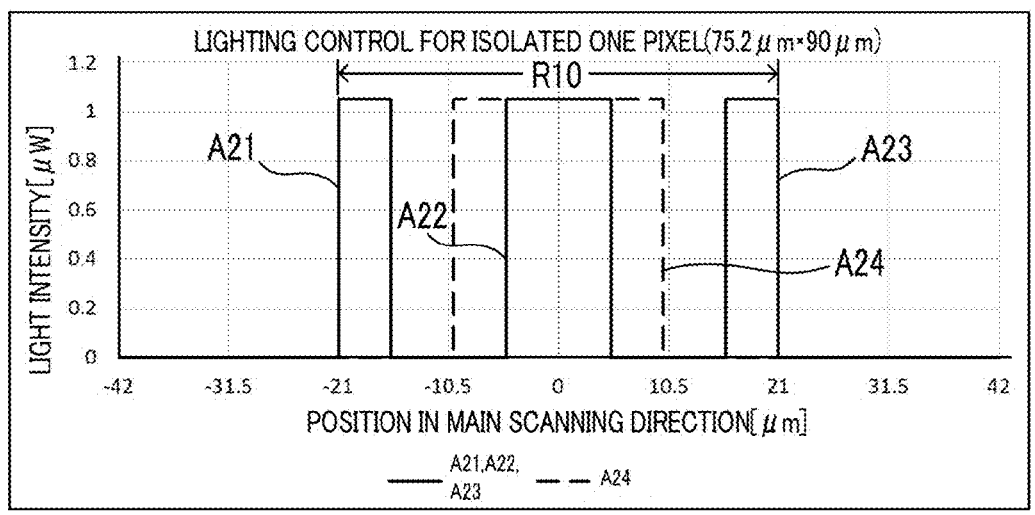

The example 2 (simulation 2) is described with reference to FIGS. 7A and 7B. FIG. 7A shows a light quantity distribution obtained by performing a simulation in which stationary beams 201 and 202 of different spot diameters were irradiated to the pixel area R10 for a predetermined time period ($2.80 \times 10^{-8}$ s). FIG. 7B shows control pulses A21 to A23 for the lighting control applied to the stationary beam 201, and a control pulse A24 for the lighting control applied to the stationary beam 202 in the simulation of the example 2.

In the example 2, the stationary beam 201 is a light beam whose spot diameter is set to 75.2 μm, and the stationary beam 202 is a light beam whose spot diameter is set to 90.0 μm. In the example 2, a simulation was performed by performing a lighting control using the control pulses shown in FIG. 7B so that the spot diameter of the stationary beam 201 was changed from 75.2 μm to 90.0 μm that was the spot diameter of the stationary beam 202, namely for alignment of the size of the spot diameters. Here, the simulation conditions for FIG. 7B were: the light intensity of each control pulse was 1.05 mW, the exposure time period of the control pulses A21 and A23 was $3.33 \times 10^{-10}$ s, the exposure time period of the control pulse A22 was $6.67 \times 10^{-9}$ s, the exposure time period of the control pulse A24 was $1.33 \times 10^{-8}$ s, the scan length during the lighting of the control pulses A21 and A23 was 5 μm, the scan length during the lighting of the control pulse A22 was 10 μm, the scan length during the lighting of the control pulse A24 was 20 μm, the light energy (exposure energy) of the control pulses A21 to A23 was 0.393701 μJ/cm², and the light energy (exposure energy) of the control pulse A24 was 0.787402 μJ/cm². Otherwise, the example 2 had the same conditions as the example 1.

In the example 2, as shown in FIG. 7B, in the pixel area R10, with regard to the stationary beam 201 having a small spot diameter, three irradiation positions, namely, the center and two ends in the main scanning direction D31, were determined, and the control pulses A21 to A23 corresponding to the irradiation positions were used. That is, light beams of the control pulses A21 to A23 were irradiated to the pixel area R10 at three irradiation timings. In addition, the irradiation timings of the three control pulses A21 to A23 were determined to have equal intervals in the main scanning direction D31. That is, in the pixel area R10, the irradiation timings and the irradiation positions of light beams of the control pulses A21 to A23 have equal intervals. In addition, with regard to the stationary beam 201, the irradiation timing of the control pulse A22 was determined to correspond to the center position in the main scanning direction D31, and the irradiation timings of the other two control pulses A21 and A23 were determined so that light beams were irradiated to the irradiation positions that are located symmetrical with respect to the center position in the main scanning direction D31. That is, the irradiation positions of light beams irradiated at a plurality of irradiation timings by the control pulses A21 and A23 were located to be symmetrical with respect to the center position in the main scanning direction D31. In addition, with regard to the stationary beam 202 that has a large spot diameter, the irradiation timing of one control pulse (the control pulse A24) was determined to correspond to the center position so that the light intensity was concentrated at the center position in the main scanning direction D31. The example 2 was greatly different from the example 1 in that the light intensity of each control pulse was set to be approximately one-fourth of the example 1 and the exposure time period and the scan length were set to be approximately five times those of the example 1. In the other points including the arrangement and the number of control pulses, the example 2 was the same as the example 1.

As was the case with the example 1, the simulation of the example 2 could obtain the results that in the two dynamic beams obtained by the lighting control shown in FIG. 7B, it was possible to make equal the light quantity distributions and align the size of the spot diameters (to 90.0 μm, for example). It is noted that the dynamic beams of the example 2 had approximately the same waveform as those of the example 1, and thus showing the dynamic beams of the example 2 in the drawings is omitted.

It is understood from the above that, by applying the lighting control shown in FIG. 7B, it is possible to make approximately equal the light quantity distributions of light beams and approximately align the size of the spot diameters of light beams even when the maximum difference between spot diameters is 14.8 (=90.0–75.2) μm in the main scanning direction D31.

Example 3

Figure 8A:
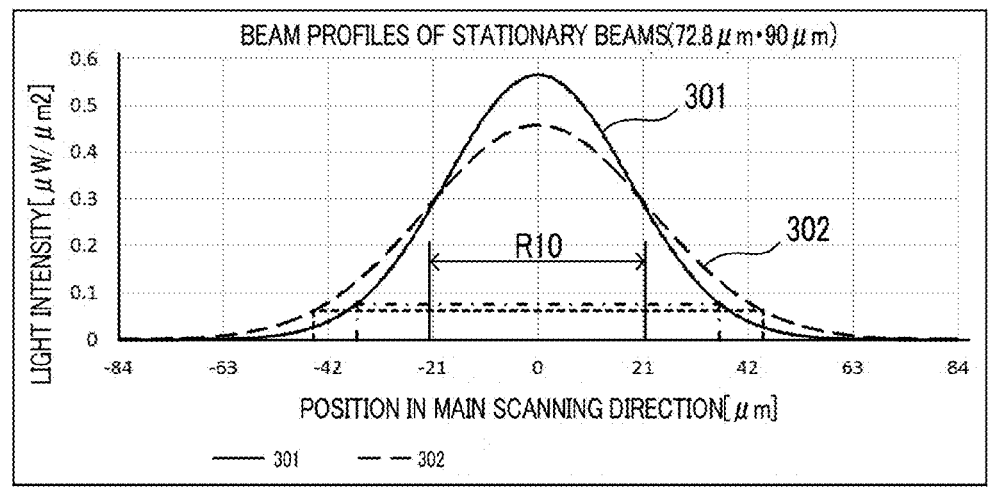
FIG. 8A and FIG. 8B are diagrams for explaining an example 3 of the first embodiment of the present disclosure.
Figure 8B:
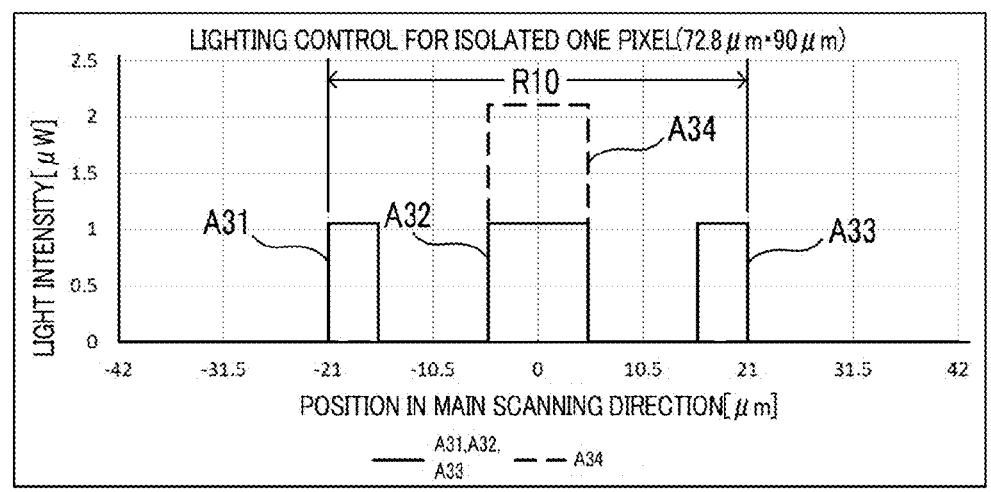

The example 3 (simulation 3) is described with reference to FIGS. 8A and 8B. FIG. 8A shows a light quantity distribution obtained by performing a simulation in which stationary beams 301 and 302 of different spot diameters were irradiated to the pixel area R10 for a predetermined time period ($2.80 \times 10^{-8}$ s). FIG. 8B shows control pulses A31 to A33 for the lighting control applied to the stationary beam 301, and a control pulse A34 for the lighting control applied to the stationary beam 302 in the simulation of the example 3.

In the example 3, the stationary beam 301 is a light beam whose spot diameter is set to 72.8 μm, and the stationary beam 302 is a light beam whose spot diameter is set to 90.0 μm. In the example 3, a simulation was performed by performing a lighting control using the control pulses shown in FIG. 8B so that the spot diameter of the stationary beam 301 was changed from 72.8 μm to 90.0 μm that was the spot diameter of the stationary beam 302, namely for alignment of the size of the spot diameters. Here, the simulation conditions for FIG. 8B were: the light intensity of each control pulse was 1.05 mW, the light intensity of control pulses A31 to A33 was 1.05 mW, the light intensity of the control pulse A34 was 2.10 mW, the exposure time period of the control pulses A31 and A33 was $3.33 \times 10^{-10}$ s, the exposure time period of the control pulses A32 and A34 was $6.67 \times 10^{-9}$ s, the scan length during the lighting of the control pulses A31 and A33 was 5 μm, the scan length during the lighting of the control pulses A32 and A34 was 10 μm, the light energy (exposure energy) of the control pulses A31 to A34 was 0.393701 μJ/cm². Otherwise, the example 3 had the same conditions as the example 2.

In the example 3, as shown in FIG. 8B, in the pixel area R10, with regard to the stationary beam 301 having a small spot diameter, three irradiation positions, namely, the center and two ends in the main scanning direction D31, were determined, and the control pulses A31 to A33 (same as the control pulses A21 to A23) corresponding to the irradiation positions were used. In addition, with regard to the stationary beam 302 that has a large spot diameter, the irradiation timing of one control pulse (the control pulse A34) was determined to correspond to the center position so that the light intensity was concentrated at the center position in the main scanning direction D31. The example 3 was greatly different from the example 2 in that the scan length of the control pulse A34 was set to be approximately half of the example 2 and the light intensity of the control pulse A34 was set to be approximately twice the example 2. In the other points including the arrangement and the number of control pulses, the example 3 was the same as the example 2.

As was the case with the example 1, the simulation of the example 3 could obtain the results that in the two dynamic beams obtained by the lighting control shown in FIG. 8B, it was possible to make equal the light quantity distributions and align the size of the spot diameters (to 90.0 μm, for example). It is noted that the dynamic beams of the example 3 had approximately the same waveform as those of the example 1, and thus showing the dynamic beams of the example 3 in the drawings is omitted.

It is understood from the above that, by applying the lighting control shown in FIG. 8B, it is possible to make approximately equal the light quantity distributions of light beams and approximately align the size of the spot diameters of light beams even when the maximum difference between spot diameters is 17.2 (=90.0−72.8) μm in the main scanning direction D31.

Example 4

Figure 9A:
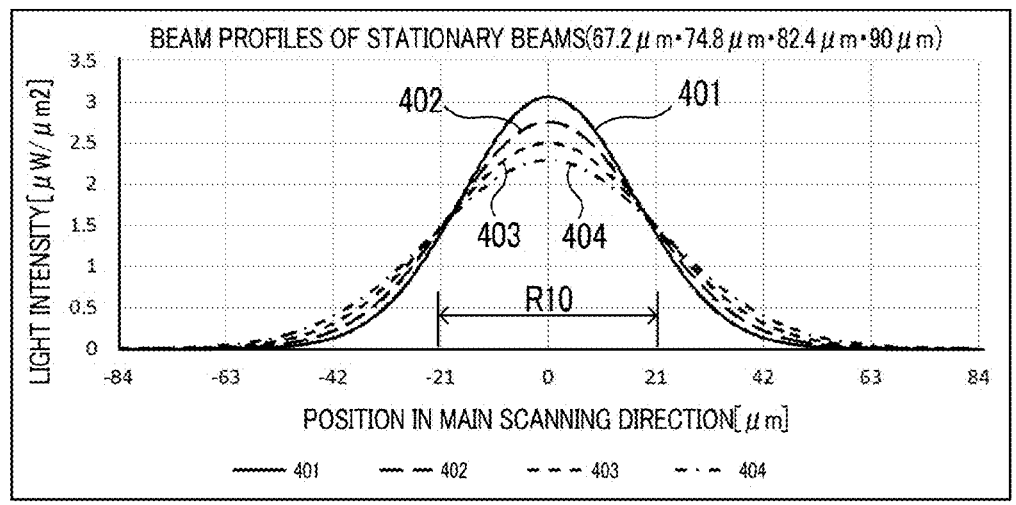
FIG. 9A and FIG. 9B are diagrams for explaining an example 4 of the first embodiment of the present disclosure.
Figure 9B:
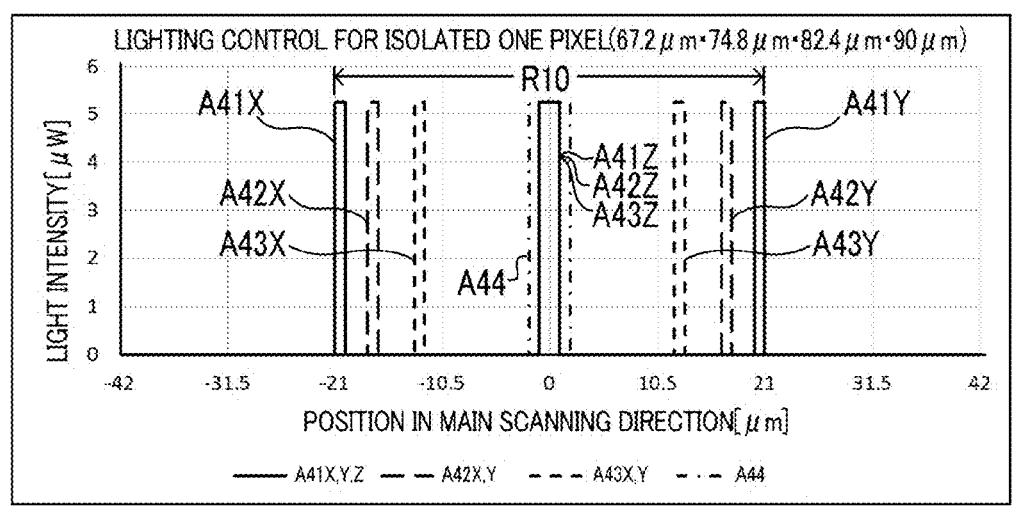

The example 4 (simulation 4) is described with reference to FIGS. 9A and 9B. FIG. 9A shows a light quantity distribution obtained by performing a simulation in which stationary beams 401 to 404 of different spot diameters were irradiated to the pixel area R10 for a predetermined time period ($2.80 \times 10^{-8}$ s). FIG. 9B shows control pulses A41X, A41Y and A41Z for the lighting control applied to the stationary beam 401, control pulses A42X, A42Y and A42Z for the lighting control applied to the stationary beam 402, control pulses A43X, A43Y and A43Z for the lighting control applied to the stationary beam 403, and control pulse A44 for the lighting control applied to the stationary beam 404. It is noted that, in FIG. 9B, the control pulses A41Z, A42Z and A43Z located at the center have the same pulse form, and thus overlap each other.

In the example 4, the stationary beam 401 is a light beam whose spot diameter is set to 67.2 μm, the stationary beam 402 is a light beam whose spot diameter is set to 74.8 μm, the stationary beam 403 is a light beam whose spot diameter is set to 82.4 μm, and the stationary beam 404 is a light beam whose spot diameter is set to 90.0 μm. In the example 4, a simulation was performed by performing a lighting control using the control pulses shown in FIG. 9B so that the spot diameters of the stationary beam 401 to 403 were changed to 90.0 μm that was the spot diameter of the stationary beam 404, namely for alignment of the size of the spot diameters. Here, the simulation conditions for FIG. 9B were: the light intensity of each control pulse was 5.25 mW, the exposure time period of the control pulses excluding the one at the center was $6.67 \times 10^{-10}$ s, the scan length of the control pulses excluding the one at the center was 1 μm, the exposure time period of the control pulses A41Z, A42Z and A43Z was $1.33 \times 10^{-9}$ s, the scan length of the control pulses A41Z, A42Z and A43Z was 2 μm, the exposure time period of the control pulse A44 was $2.67 \times 10^{-9}$ s, the scan length of the control pulse A44 was 4 μm, the light energy (exposure energy) of the control pulse A44 was 0.787402 μJ/cm², the light energy (exposure energy) of the control pulses A41X to A41Z was 0.393701 μJ/cm², the light energy (exposure energy) of the control pulses A42X to A42Z was 0.393701 μJ/cm², and the light energy (exposure energy) of the control pulses A43X to A43Z was 0.393701 μJ/cm². Otherwise, the example 4 had the same conditions as the example 3.

In the example 4, as shown in FIG. 9B, in the pixel area R10, with regard to the stationary beam 401, three irradiation positions, namely, the center and two ends in the main scanning direction D31, were determined, and the control pulses A41X to A41Z corresponding to the irradiation positions were used. The outermost control pulses A41X and A41Y are located symmetrical with respect to the center position in the main scanning direction D31. Specifically, with regard to the control pulses A41X and A41Y, the irradiation timings were determined so that light beams were irradiated to the outermost irradiation positions (boundaries with adjacent pixel areas) in the pixel area R10 in the main scanning direction D31. Similarly, with regard to the stationary beam 402, too, the control pulses A42X to A42Z corresponding to three irradiation positions were used, and with regard to the control pulses A42X and A42Y located on both sides of the center, the irradiation timings were determined so that light beams were irradiated to irradiation positions that were each 17.3 μm away from the center position. With regard to the stationary beam 403, too, the control pulses A43X to A43Z corresponding to three irradiation positions were used, and with regard to the control pulses A43X and A43Y located on both sides of the center, the irradiation timings were determined so that light beams were irradiated to irradiation positions that were each 12.7 μm away from the center position. In addition, with regard to the stationary beam 404 that has the largest spot diameter, the irradiation timing of one control pulse (the control pulse A44) was determined to correspond to the center position so that the light intensity was concentrated at the center position in the main scanning direction D31. In the example 4, except for the control pulse A44, the smaller the spot diameters of the control pulses were, the farther from the center position the irradiation positions were determined to be, and the larger the spot diameters of the control pulses were, the closer to the center position the irradiation positions were determined to be.

The simulation of the example 4 could also obtain the results that in the four dynamic beams obtained by the lighting control shown in FIG. 9B, it was possible to make equal the light quantity distributions of the four dynamic beams and align the size of the spot diameters (to 90.0 µm). It is noted that the dynamic beams of the example 4 had approximately the same waveform as those of the example 1, and thus showing the dynamic beams of the example 4 in the drawings is omitted.

It is understood from the above that, by applying the lighting control shown in FIG. 9B, it is possible, with respect to four light beams of different spot diameters, to make approximately equal the light quantity distributions of light beams and approximately align the size of the spot diameters of light beams. In addition, with this simulation, it was confirmed that it is possible to easily correct light beams regardless of the size of the spot diameters, by using three control pulses and determining the irradiation positions of the control pulses such that the smaller the spot diameters of the control pulses are, the farther from the center position the irradiation positions of the control pulses are determined to be, as shown in FIG. 9B.

Examples 5 and 6

Figure 10A:
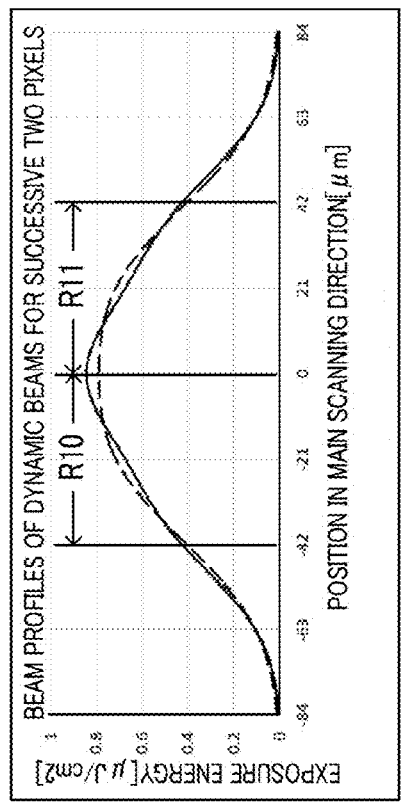
FIG. 10A to FIG. 10D are diagrams for explaining an example 5 of the first embodiment of the present disclosure.

The example 5 (simulation 5) is described with reference to FIG. 10A to FIG. 10D. FIG. 10A to FIG. 10D are diagrams for explaining the example 5 of the present embodiment. FIG. 10A shows control pulses A51 and A52 for the lighting control applied to the stationary beam 101 of the example 1, and the control pulse A52 for the lighting control applied to the stationary beam 102 of the example 1. In the above-described examples 1 to 4, three control pulses were applied to light beams whose spot diameters were small. In the example 5, two control pulses A51 and A52 were applied instead. It is noted that the simulation conditions of the example 5 were approximately the same as those of the example 1. With regard to the stationary beam 101, the irradiation positions of the two control pulses A51 and A52 were located symmetrical with respect to the center position in the main scanning direction D31.

Figure 10C:
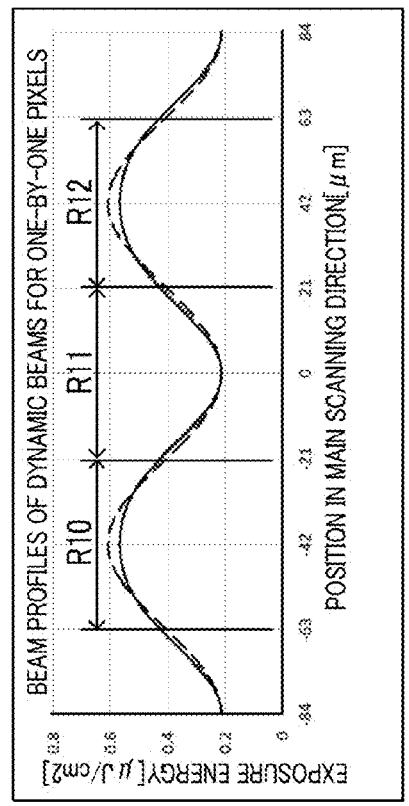
Figure 10B:
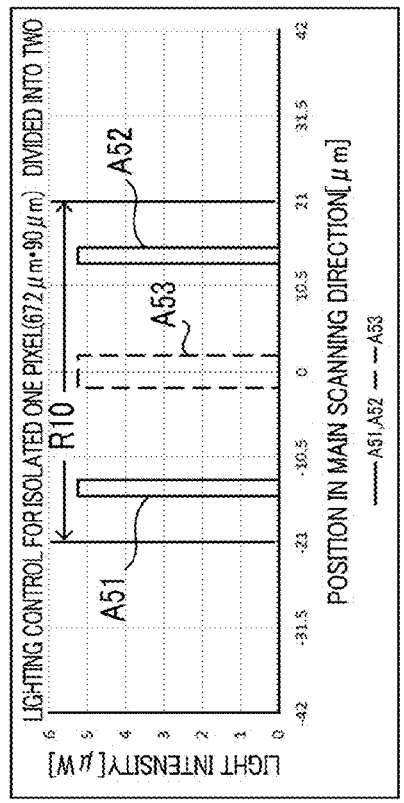
Figure 10D:
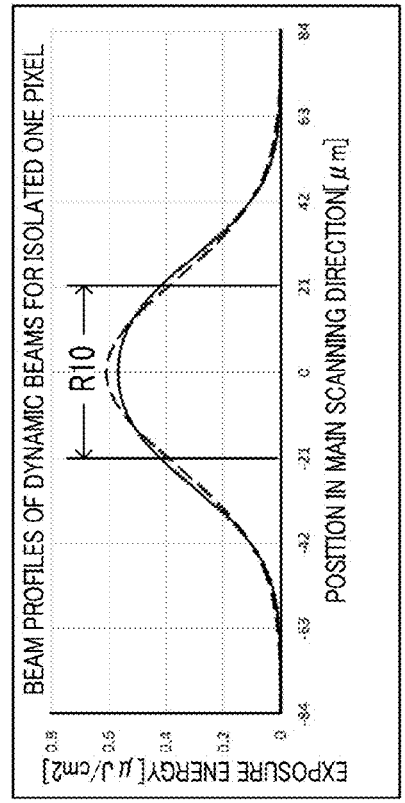
Figure 11A:
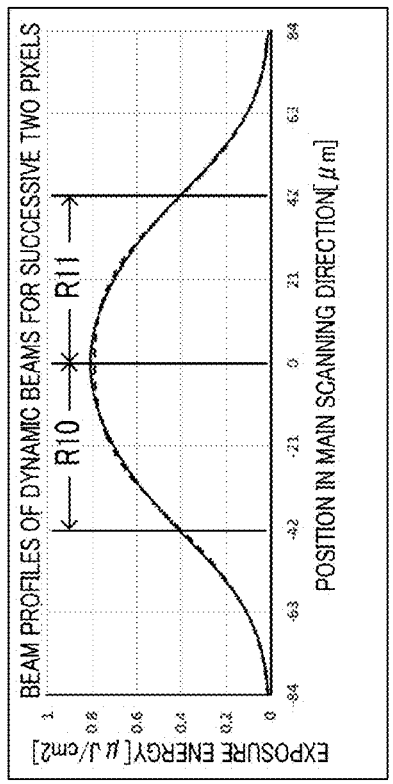
FIG. 11A to FIG. 11D are diagrams for explaining an example 6 of the first embodiment of the present disclosure.
Figure 11C:
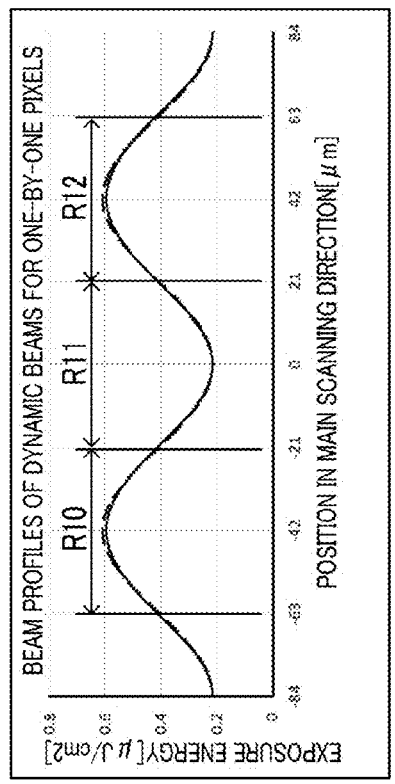
Figure 11B:
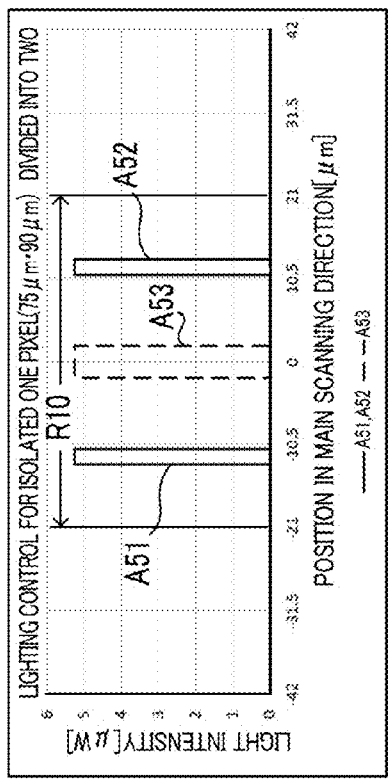
Figure 11D:
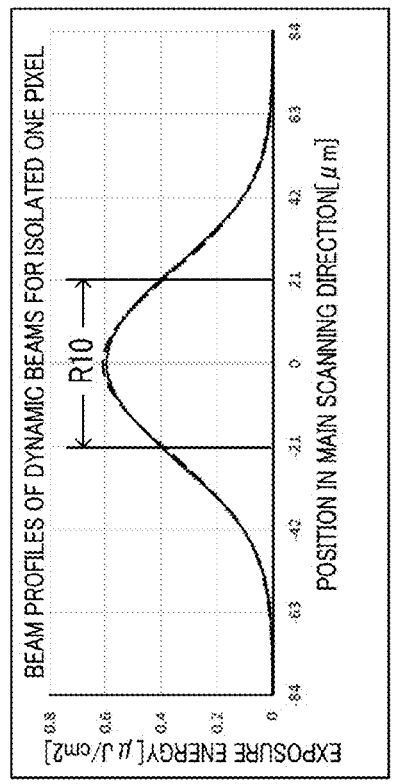

FIG. 10B to FIG. 10D show dynamic beams obtained when the lighting control shown in FIG. 10A was performed on the stationary beams 101 and 102 having different profiles. FIG. 10B shows light quantity distributions of dynamic beams obtained when light beams were scanned to the pixel area R10. FIG. 10C shows light quantity distributions of dynamic beams obtained when light beams were scanned to successive pixel areas R10 and R11. FIG. 10D shows light quantity distributions of dynamic beams obtained when light beams were scanned to pixel areas R10 to R12 corresponding to one-by-one pixels. It is understood that in each of the drawings, the light quantity distributions approximately match each other. However, the matchness is lower than the cases of the above-described examples 1 to 4. It is understood from this that, with respect to light beams having small spot diameters, application of three control pulses can produce a higher level of match among the light quantity distributions. In particular, when there is a large difference among spot diameters, it becomes difficult for the light quantity distributions to match each other, and in that case, it is preferable to apply three or more control pulses distributedly to the pixel area R10.

FIG. 11A to FIG. 11D are diagrams for explaining the example 6 of the present embodiment, and show simulation results of the example 6 (simulation 6) in which the control pulses A51 to A53 used in the example 5 were applied to light beams whose difference between spot diameters was relatively small (75.0 µm and 90.0 µm). Upon viewing FIG. 11A to FIG. 11D, it is understood that even when the two control pulses A51 and A52 were applied to a light beam that had a smaller spot diameter, the light quantity distributions approximately matched each other. That is, it is understood that when the difference between spot diameters is less than 15 µm, even an application of two control pulses can make approximately equal the light quantity distributions and approximately align the size of the spot diameters. In addition, it has been confirmed from the simulation results of the examples 5 and 6 that when the difference between spot diameters exceeds 15 µm, it is preferable to apply three or more control pulses so as to increase the level of matchness among the light quantity distributions and the spot diameters.

Example 7

Figure 12A:
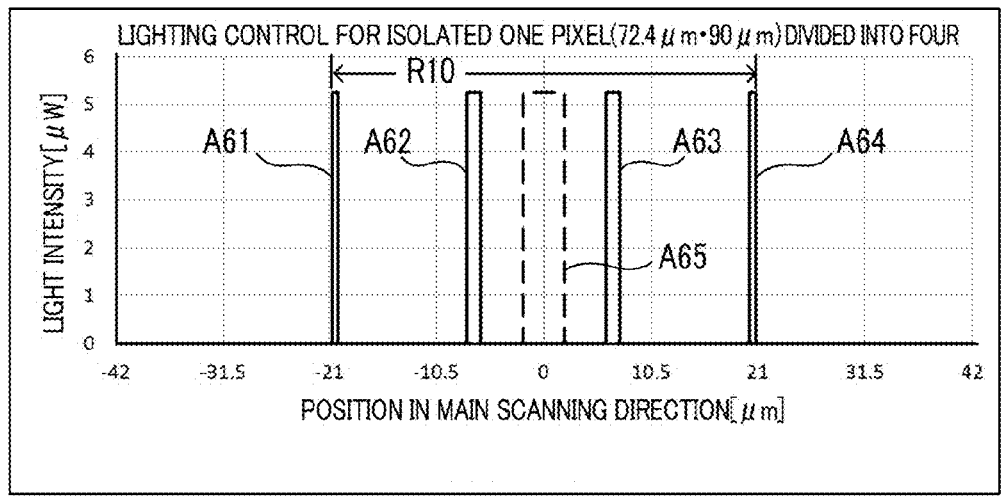
FIG. 12A is a diagram for explaining an example 7 of the first embodiment of the present disclosure, and is a diagram showing control pulses used in a lighting control applied to the example 7.

The example 7 (simulation 7) is described with reference to FIG. 12A. FIG. 12A shows a simulation in which four control pulses A61 to A64 were applied to a light beam having a small spot diameter, and one control pulse A65 was applied to a light beam having a large spot diameter. It has been confirmed from the simulation results of the example 7 that the light quantity distributions and the spot diameters are approximately equal in the two dynamic beams obtained from the simulation in which the irradiation positions by the four control pulses A61 to A64 used in the lighting control are determined to be located on both sides of the center position in the main scanning direction D31, two irradiation positions on each side, as shown in FIG. 12A.

Example 8

Figure 12B:
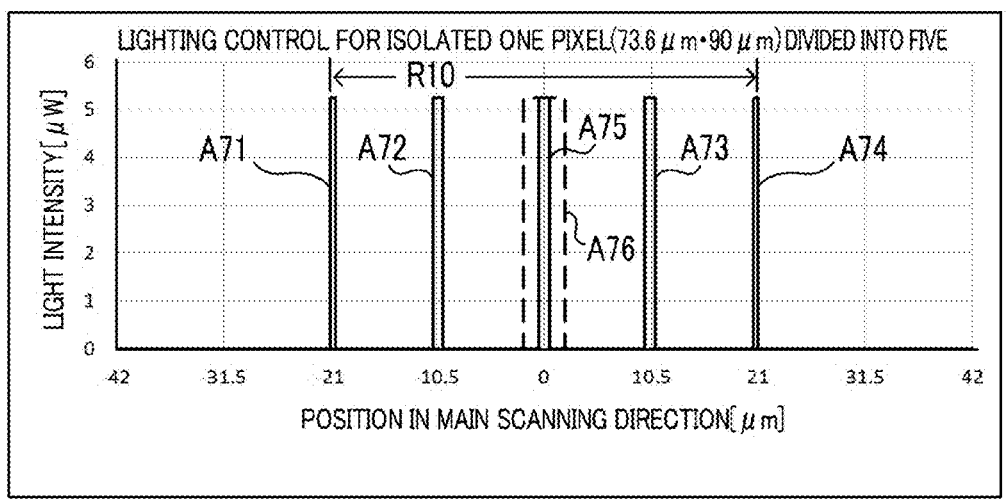
FIG. 12B is a diagram for explaining an example 8 of the first embodiment of the present disclosure, and is a diagram showing control pulses used in a lighting control applied to the example 8.

The example 8 (simulation 8) is described with reference to FIG. 12B. FIG. 12B shows a simulation in which five control pulses A71 to A75 were applied to a light beam having a small spot diameter, and one control pulse A76 was applied to a light beam having a large spot diameter. It has been confirmed from the simulation results of the example 8 that the light quantity distributions and the spot diameters of light beams are approximately equal in the two dynamic beams obtained from the lighting control even when the five control pulses A71 to A75 used in the lighting control are applied to a light beam having a small spot diameter, as shown in FIG. 12B.

[Second Embodiment]

In the following, a second embodiment of the present disclosure is described with reference to FIG. 13A to FIG. 16B. The second embodiment differs from the above-described first embodiment in that the control portion 80 and the light source control portion 81 perform a lighting control that is different from that of the first embodiment. Otherwise, the first and second embodiments have common configurations. Accordingly, in the following description, only the different configurations are described, configurations common to the first embodiment are assigned the same reference signs, and description thereof is omitted. It is noted that the examples 1 to 8 described above are applicable to the second embodiment as well.

In the present embodiment, the control portion 80 and the light source control portion 81 control the light source 61 to irradiate, at a plurality of irradiation timings, light beams to three pixel areas R19 to R21 arranged successively in the main scanning direction D31 among a plurality of pixel areas sectioned from each other on the surface of the photoconductor drum 31 in the main scanning direction D31, the plurality of irradiation timings being determined based on the positions of the pixel areas in the main scanning direction D31. It is noted that although the three, successive pixel areas R19 to R21 are described as an example in the present embodiment, the present disclosure is applicable to successive pixel areas that are composed of at least two pixel areas.

Figure 4:
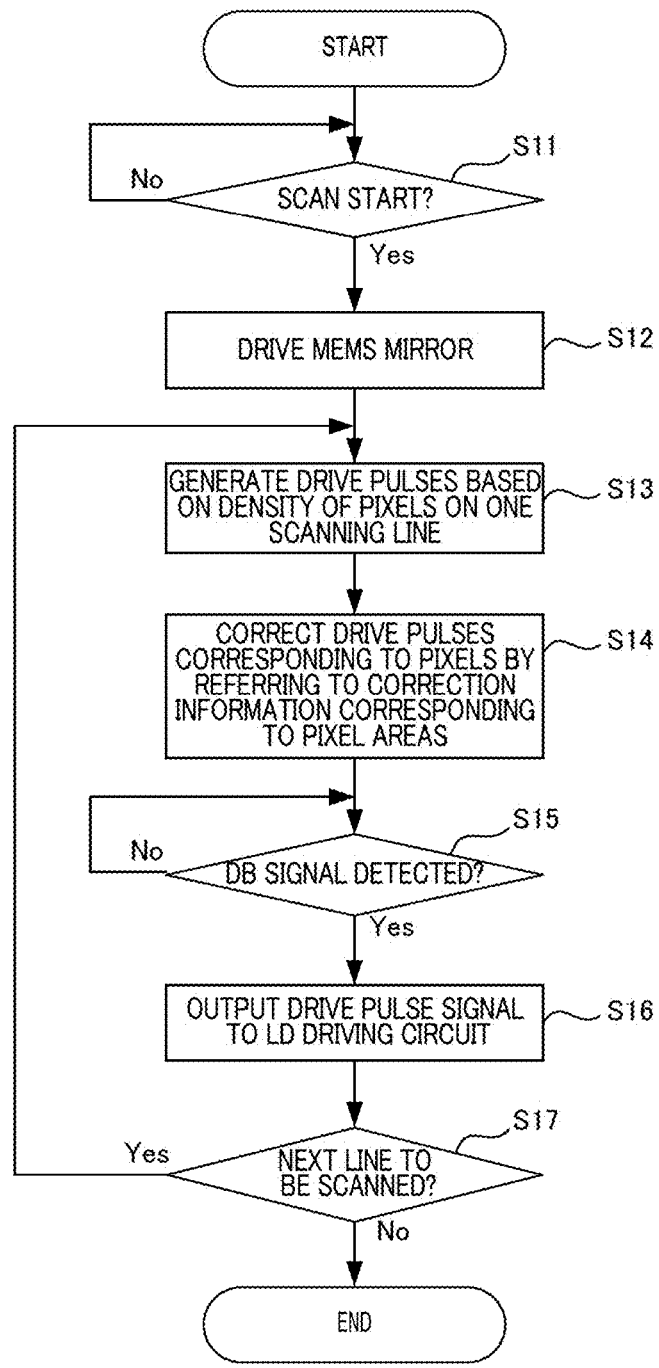
FIG. 4 is a flowchart showing an example procedure of a drive control process of a light source executed by a control portion of the image forming apparatus.
Figure 13A:
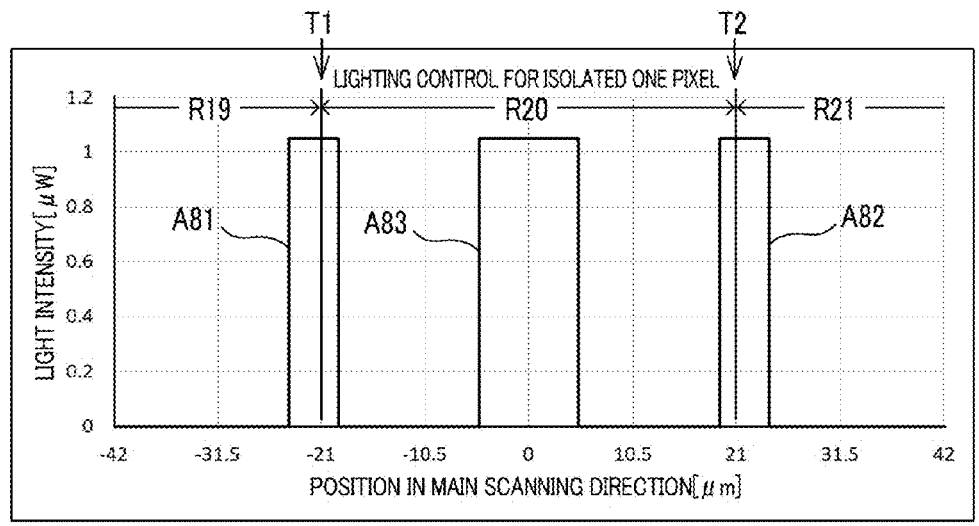
FIG. 13A and FIG. 13B are diagrams for explaining an example of a second embodiment of the present disclosure and show control pulses used in a lighting control applied to the second embodiment.

Specifically, in step S14 of FIG. 4, the light source control portion 81 performs a process of correcting the drive pulse signals generated in step S13, and dividing the drive pulse into a plurality of control pulses. In the present embodiment, in the case where, as shown in FIG. 13A, the pixel areas R19, R20 and R21 that are successive in the main scanning direction D31 are provided on the surface of the photoconductor drum 31, three control pulses A81 to A83 are generated in correspondence with three irradiation positions determined based on, for example, the position of the pixel area R20 in the main scanning direction D31. The irradiation positions of the control pulses A81 and A82 are boundaries T1 and T2 between the pixel area R20 and other pixel areas R19 and R21, respectively. The control pulse A81 corresponds to an irradiation position that includes the boundary T1, and the control pulse A82 corresponds to an irradiation position that includes the boundary T2. In addition, the irradiation position of the control pulse A83 is the center position of the pixel area R20.

The scan length of the control pulses A81 and A82 is 5 µm, and the scan length of the control pulse A83 is 10 µm. The irradiation positions of the control pulses A81 and A82 are positions that are each 21.8 µm away from the center position of the pixel area R20 in the main scanning direction D31. In addition, the light intensity (light energy) of the control pulses A81 to A83 is 1.05 mW.

Figure 13B:
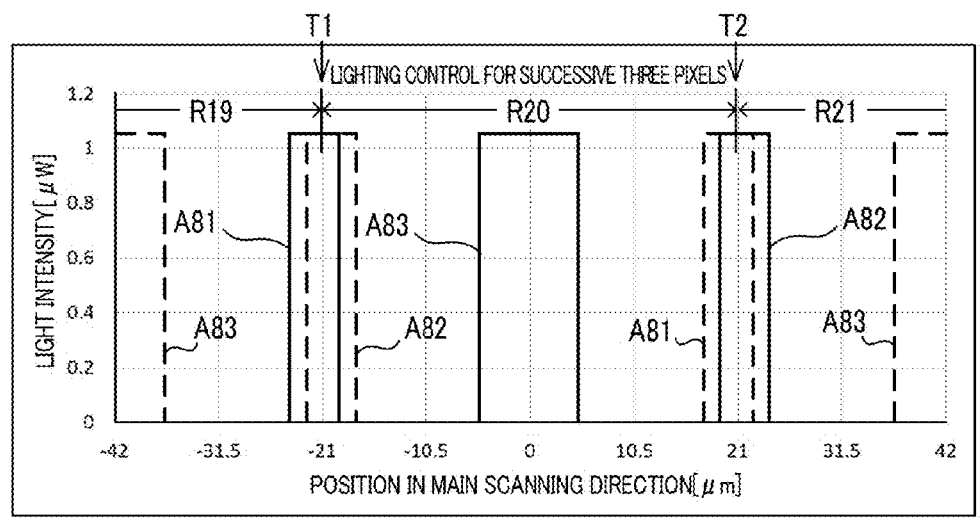
Figure 14A:
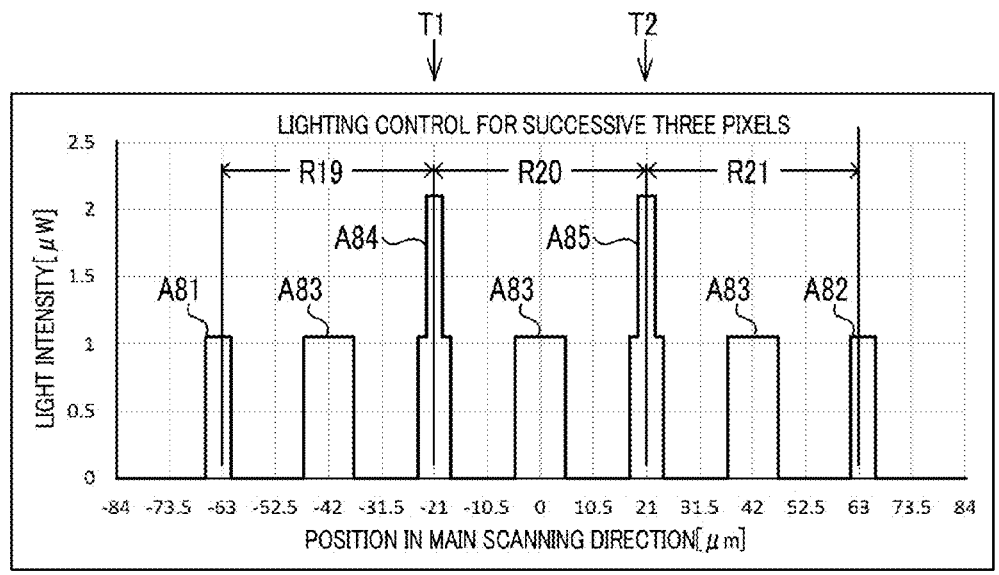
FIG. 14A shows an example of synthetic pulses generated by synthesizing overlapping control pulses among the control pulses shown in FIG. 13B.

When the light source control portion 81 causes light beams to be irradiated to the pixel areas R19, R20 and R21 by the control pulses A81 to A83 shown in FIG. 13A, the control pulses overlap at each of the boundaries T1 and T2 as shown in FIG. 13B. That is, the control pulses A81 and A82 whose irradiation positions (irradiation areas) of light beams include the boundaries T1 and T2, overlap each other. In this case, the light source control portion 81 performs, in the correction process of the step S14, a synthesizing process to synthesize the control pulses that are overlapping each other (the control pulse A82 of the pixel area R19 overlapping the control pulse A81 of the pixel area R20, and the control pulse A82 of the pixel area R20 overlapping the control pulse A81 of the pixel area R21). Hereinafter, a control pulse generated in the synthesizing process is referred to as a synthetic pulse. As shown in FIG. 14A, in the synthesizing process, synthetic pulses A84 and A85 are generated at the boundaries T1 and T2, respectively.

Since the light intensities of the overlapping portions have been added in the synthetic pulses A84 and A85, the peak value of the light intensity of the synthetic pulses A84 and A85 has been doubled to 2.10 mW. The amount of light energy of the synthetic pulses A84 and A85 matches the total value of the amounts of light energy of the two control pulses that were synthesized into the synthetic pulses A84 and A85. That is, the light source control portion 81 generates the synthetic pulses A84 and A85 that hold the amount of light energy of light beams corresponding to the control pulses A81 and A82 that were synthesized into the synthetic pulses A84 and A85.

Subsequently, upon detecting the DB signal from the light detecting portion 69, the control portion 80 outputs, to the LD driving circuit 61A, a drive pulse signal including the synthetic pulses generated in the correction process performed by the light source control portion 81. This allows the lighting control to be performed to the pixel areas R19 to R21 by the drive pulse signal including the plurality of control pulses shown in FIG. 14A. That is, a plurality of light beams by the plurality of control pulses shown in FIG. 14A are irradiated to the pixel areas R19 to R21 that are successive in the main scanning direction D31, at a plurality of timings.

As described above, in the second embodiment, the lighting control using control pulses that include the boundaries T1 and T2, is performed. As a result, when the lighting control is performed, for example, on the pixel area R20, a part of the light beam is irradiated to the adjacent pixel areas R19 and R21.

In addition, in the correction process, a process of synthesizing control pulses is performed. This makes it possible to reduce the number of ONs and OFFs in the lighting control of the light source 61.

Figure 14B:
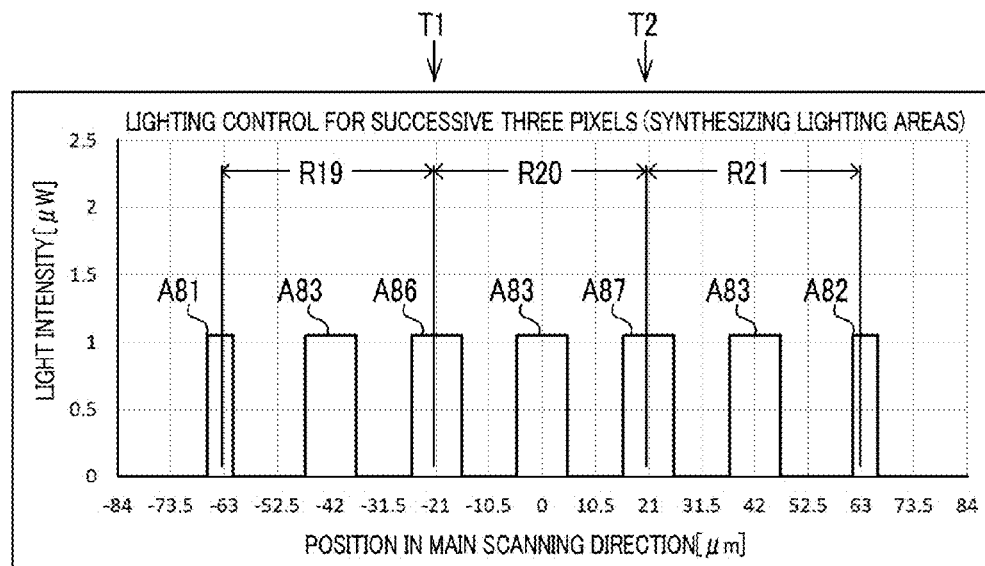
FIG. 14B is a diagram showing another example of synthetic pulses.

In addition, as described above, in the second embodiment, the peak value of the light intensity of the synthetic pulses A84 and A85 has been doubled. As a result, as shown in FIG. 14B, in the correction process, synthetic pulses A86 and A87 may be generated, wherein the peak value of the light intensity of the synthetic pulses A86 and A87 is the same as before, 1.05 mW, but the scan length has been made longer than before. This makes it possible to restrict the peak value of the light intensity from increasing.

Figure 15A:
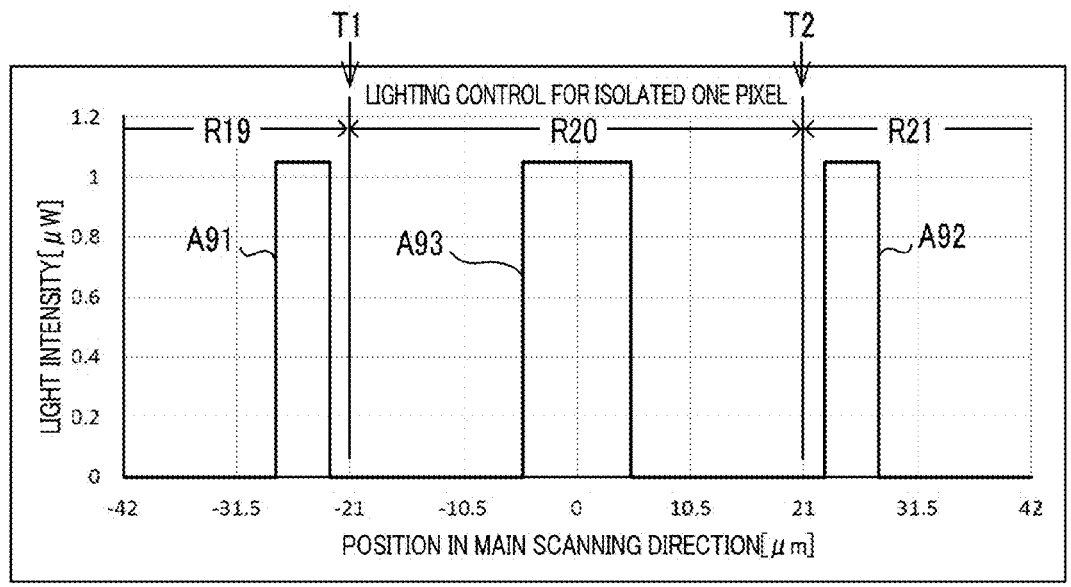
FIG. 15A and FIG. 15B are diagrams for explaining another example of the second embodiment of the present disclosure and show control pulses used in a lighting control applied to the second embodiment.

It is noted that as another example of the second embodiment, as shown in FIG. 15A, in the correction process, control pulses A91 to A93 may be generated in correspondence with three irradiation positions determined based on, for example, the position of the pixel area R20 in the main scanning direction D31. Here, the control pulse A91 corresponds to an irradiation position determined in the adjacent pixel area R19 beyond the boundary T1. The control pulse A92 corresponds to an irradiation position determined in the adjacent pixel area R21 beyond the boundary T2. In addition, the irradiation position of the control pulse A93 is the center position of the pixel area R20.

The scan length of the control pulses A91 and A92 is 5 µm, and the scan length of the control pulse A93 is 10 µm. The irradiation positions of the control pulses A91 and A92 are positions that are each 25.4 µm away from the center position of the pixel area R20 in the main scanning direction D31. In addition, the light intensity (light energy) of the control pulses A91 to A93 is 1.05 mW.

Figure 15B:
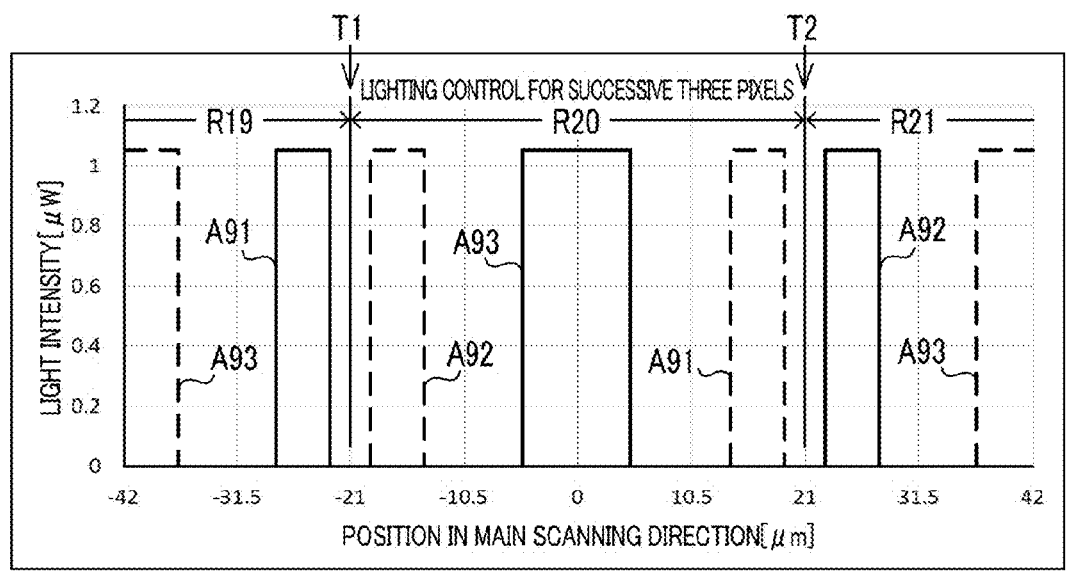

When the light source control portion 81 causes light beams to be irradiated to the pixel areas R19, R20 and R21 by the control pulses A91 to A93 shown in FIG. 15A, the control pulses do not overlap each other, as shown in FIG. 15B. That is, the control pulses A91 to A93 are determined such that light beams do not overlap each other in the adjacent pixel areas when the light beams are irradiated to the pixel areas R19, R20 and R21.

Figure 16A:
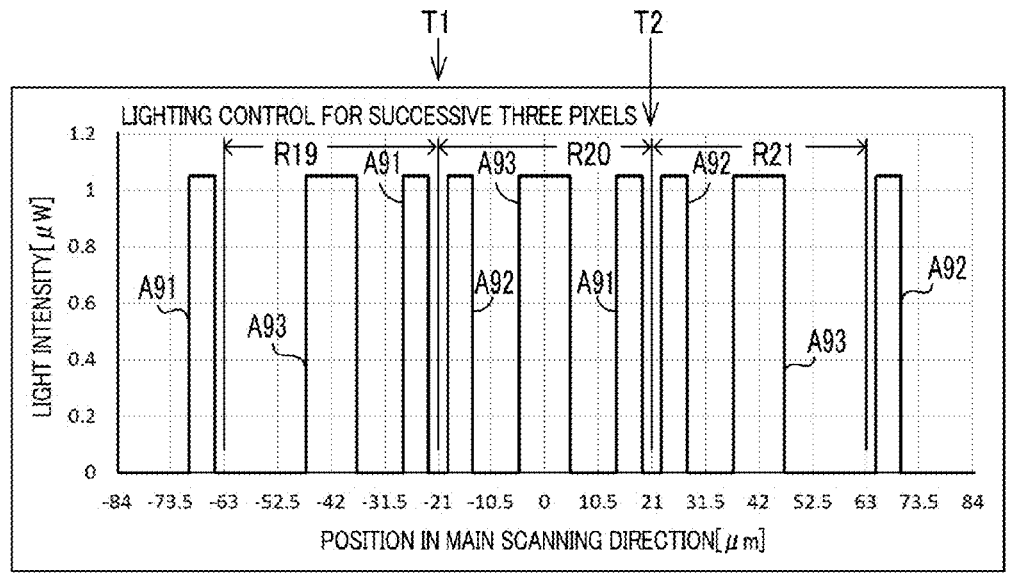
FIG. 16A and FIG. 16B show an example of synthetic pulses generated by synthesizing control pulses that are in proximity to each other among the control pulses shown in FIG. 15B.
Figure 16B:
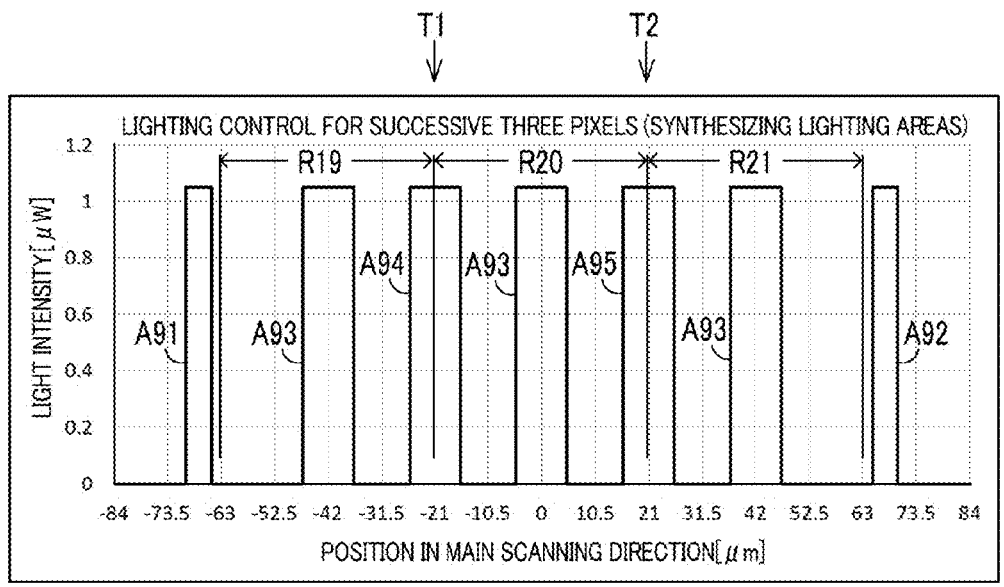

On the other hand, as shown in FIG. 16A, when light beams are irradiated to the pixel areas R19, R20 and R21, the control pulses are in proximity to each other at the boundaries T1 and T2. That is, the control pulse A92 of the pixel area R19 is in proximity to the control pulse A91 of the pixel area R20 at the boundary T1, and the control pulse A92 of the pixel area R20 is in proximity to the control pulse A91 of the pixel area R21 at the boundary T2. In this case, the light source control portion 81 performs, in the correction process of the step S14, a synthesizing process to synthesize the control pulses that are in proximity to each other. As shown in FIG. 16B, in the synthesizing process, synthetic pulses A94 and A95 are generated at the boundaries T1 and T2, respectively. In the present synthesizing process, each of the synthetic pulses A94 and A95 is generated such that its center in the main scanning direction D31 is at an average center position (boundary T1, T2) of the irradiation positions of the light beams corresponding to the control pulses that are synthesized.

As described above, in the correction process, control pulses that are in proximity to each other at the boundaries T1 and T2 are synthesized. This makes it possible to reduce the number of ONs and OFFs in the lighting control of the light source 61.

[Third Embodiment]

In the following, a third embodiment of the present disclosure is described with reference to FIG. 17 to FIG. 23. The third embodiment differs from the above-described first embodiment in that the control portion 80 and the light source control portion 81 perform a lighting control that is different from that of the first embodiment. Otherwise, the first and third embodiments have common configurations. Accordingly, in the following description, only the different configurations are described, configurations common to the first embodiment are assigned the same reference signs, and description thereof is omitted. It is noted that the examples 1 to 8 described above are applicable to the third embodiment as well.

Figure 17:
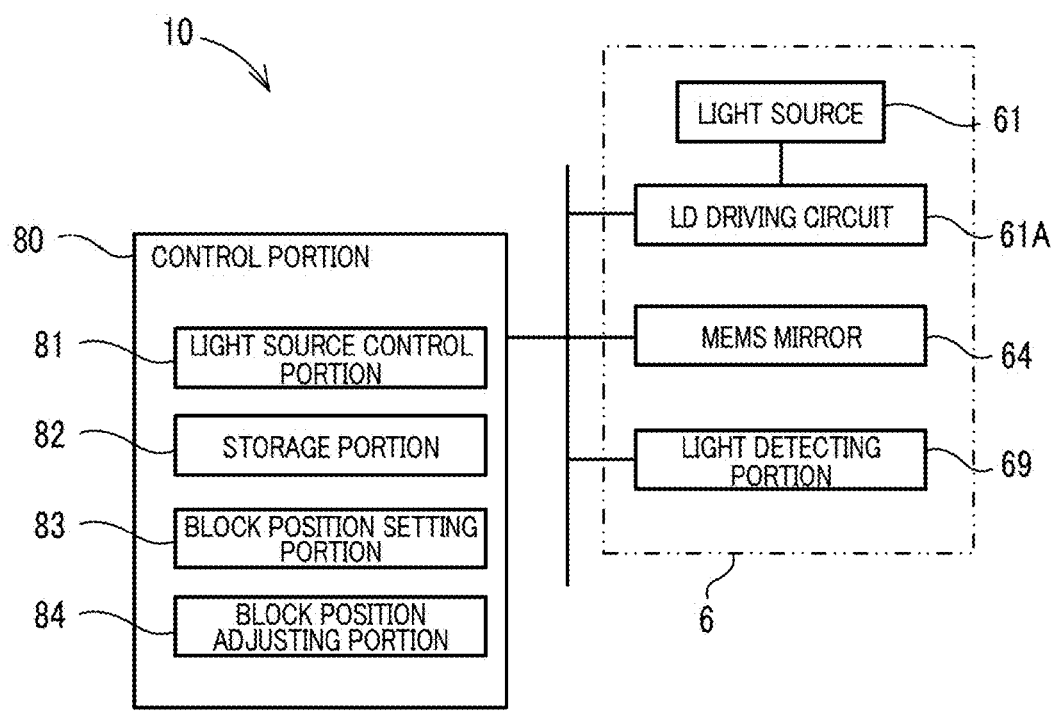
FIG. 17 is a block diagram showing a system configuration of the image forming apparatus according to a third embodiment of the present disclosure.

In the present embodiment, as shown in FIG. 17, the control portion 80 functions as a block position setting portion 83 and a block position adjusting portion 84 when it causes the CPU to execute processes in accordance with control programs stored in the ROM or the like.

The block position setting portion 83 sets block areas which each include a plurality of pixel areas sectioned from each other on the surface of the photoconductor drum 31 in the main scanning direction D31. Specifically, in the case where a plurality of pixel areas are sectioned from each other in the main scanning direction D31 in one scanning line based on 600 dpi resolution, a block area composed of a predetermined number of pixel areas is set. A plurality of such block areas are sectioned from each other along the main scanning direction D31. The block position setting portion 83 changes the positions of all block areas at predetermined cycles. For example, the block position setting portion 83 changes the positions of the block areas along a sinusoidal wave or a triangular wave that oscillates in the main scanning direction D31. Information concerning the sinusoidal wave or the triangular wave is stored in the storage portion 82 in advance as cycle information. The block position setting portion 83 changes the positions of the block areas by referring to the cycle information of the sinusoidal wave or the triangular wave stored in the storage portion 82.

The block position adjusting portion 84 adjusts the positions of the block areas set by the block position setting portion 83. For example, the block position adjusting portion 84 changes the set positions of the block areas by changing the cycle information stored in the storage portion 82. For example, it is possible to shift the set positions along a sub scanning direction (a direction perpendicular to the main scanning direction D31) by changing the frequency or the cycle of the triangular wave or the sinusoidal wave. In addition, it is possible to shift the set positions along the main scanning direction D31 by changing the amplitude of the triangular wave or the sinusoidal wave.

Different from the above-described embodiments, the control portion 80 controls the light source 61 to irradiates light beams to the plurality of pixel areas at a plurality of irradiation timings that are determined for each of the block areas set by the block position setting portion 83. The plurality of irradiation timings are calculated in advance for each of the block areas based on a simulation or measured data, and stored in the storage portion 82. It is noted that the third embodiment differs from the above-described first embodiment in that the plurality of irradiation timings are calculated in advance for each of the block areas. Otherwise, the first and third embodiments have common configurations. That is, the light source control portion 81 corrects the drive pulse signal to include control pulses that indicate the plurality of irradiation timings determined for each of the block areas, and outputs the corrected drive pulse signal to the LD driving circuit 61A. The LD driving circuit 61A then causes the light source 61 to irradiate light beams in accordance with the drive pulse signal.

Figure 18:
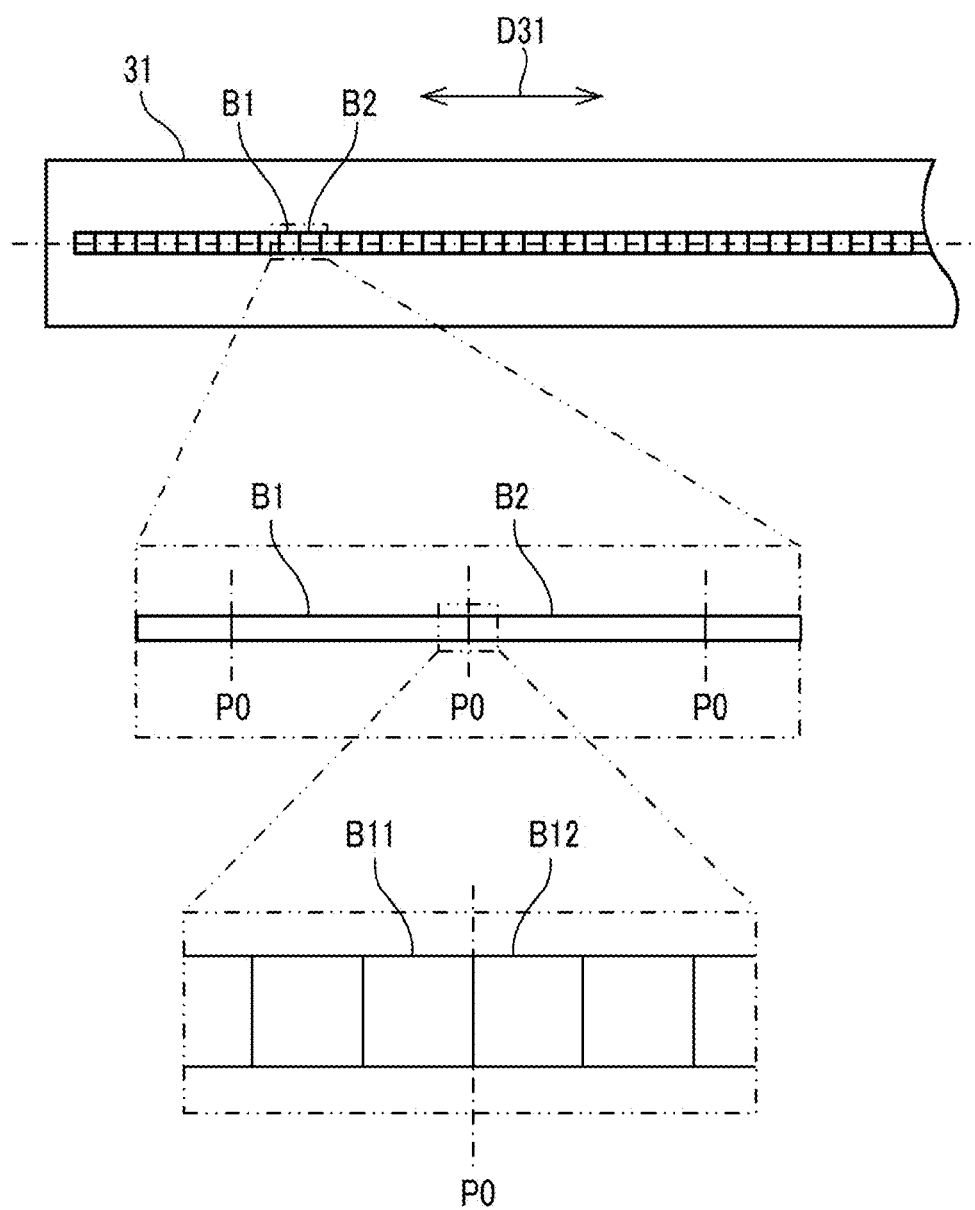
FIG. 18 is a schematic diagram showing a boundary between block areas defined on a scanned surface.
Figure 19:
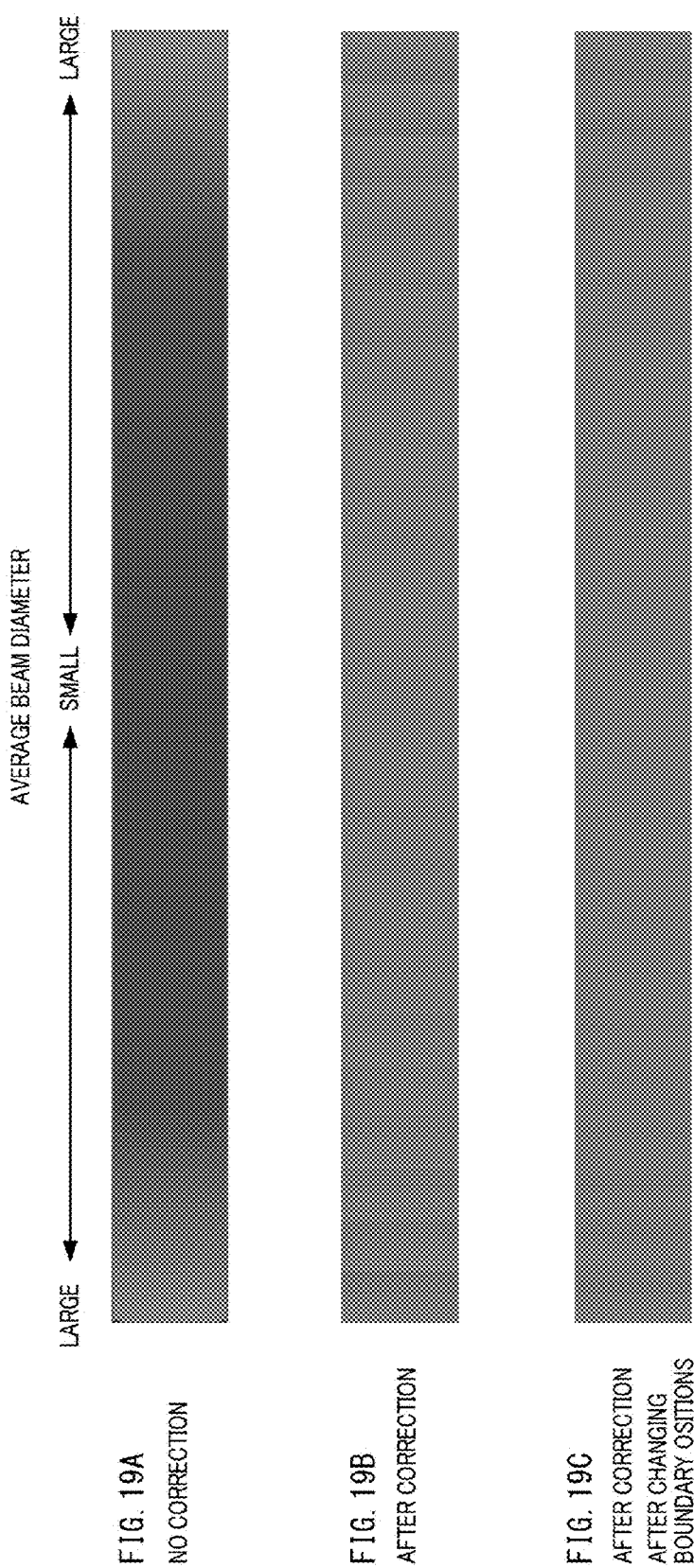
FIG. 19A is a diagram showing a print state of a solid image obtained by scanning a light beam in accordance with a drive pulse signal before correction.
FIG. 19B is a diagram showing a print state of a solid image obtained by scanning a light beam in accordance with a drive pulse signal after correction.
FIG. 19C is a diagram showing a print state of a solid image obtained by scanning a light beam in accordance with a drive pulse signal after correction, and after changing boundary positions.

When, as described above, light beams are irradiated at the same irradiation timings to the pixel areas in each of the block areas sectioned from each other in the main scanning direction D31, the computation load of the CPU and the like in the control portion 80 is reduced compared to a case where light beams are irradiated to the pixel areas at irradiation timings that are different for each pixel area. However, when, for example, as shown in FIG. 18, adjacent block areas B1 and B2 are made approximately equal in light quantity distribution, a pixel area B11 of the block area B1 differs, in light quantity distribution, from a pixel area B12 of the block area B2, the pixel area B11 and the pixel area B12 being adjacent to each other across a boundary PO between the block areas B1 and B2. This is because a plurality of irradiation timings are determined in units of block areas, and pixel areas that are adjacent to each other across the boundary PO between block areas have different irradiation timings, and have a low level of match between the light quantity distributions. In that case, when the surface of the photoconductor drum 31 is scanned by light beams in accordance with the corrected drive pulse signal, a streaked image with a streak extending in the sub scanning direction appears at each boundary PO. In particular, the streak images are prominent in end portions in the main scanning direction D31. To cope with this problem, in the present embodiment, the block position setting portion 83 shifts the set positions of the block areas along the main scanning direction D31 for each scan of at least one line. This allows the light source control portion 81 to scan light beams to the block areas that are shifted along the main scanning direction D31 for each scan of one line, and the positions of the boundaries PO change for each scan of one line. With this configuration, the image density differences at the boundaries PO are diffused in the main scanning direction D31, and as shown in FIG. 19C, prominent streaks do not appear even in the end portions as well as the center in the main scanning direction D31. It is noted that FIG. 19A shows image densities in the case where neither correction nor positional shifting has not been performed.

Figure 20:
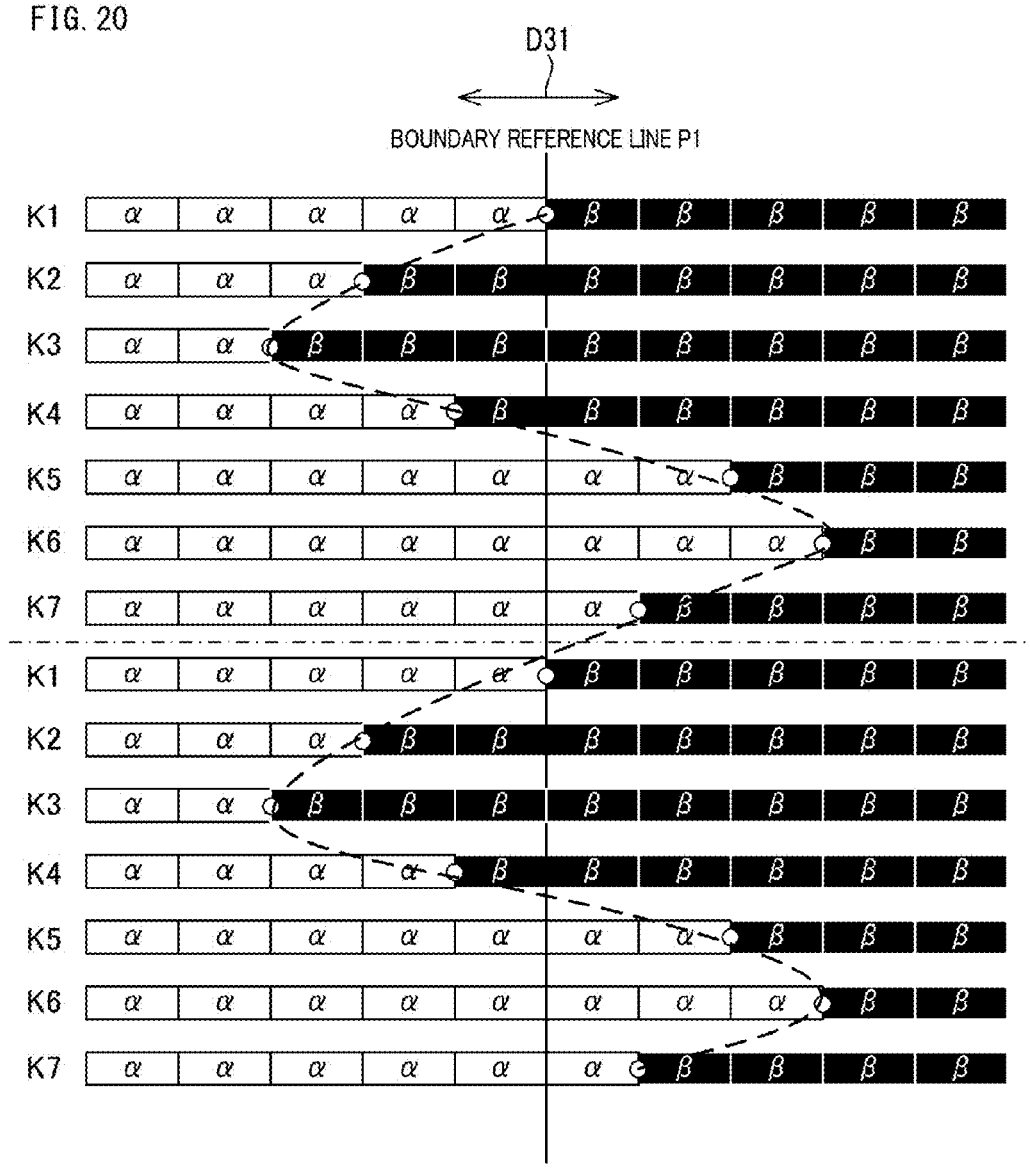
FIG. 20 is a diagram showing an example of displacement of boundary positions between block areas defined on the scanned surface.
Figure 21:
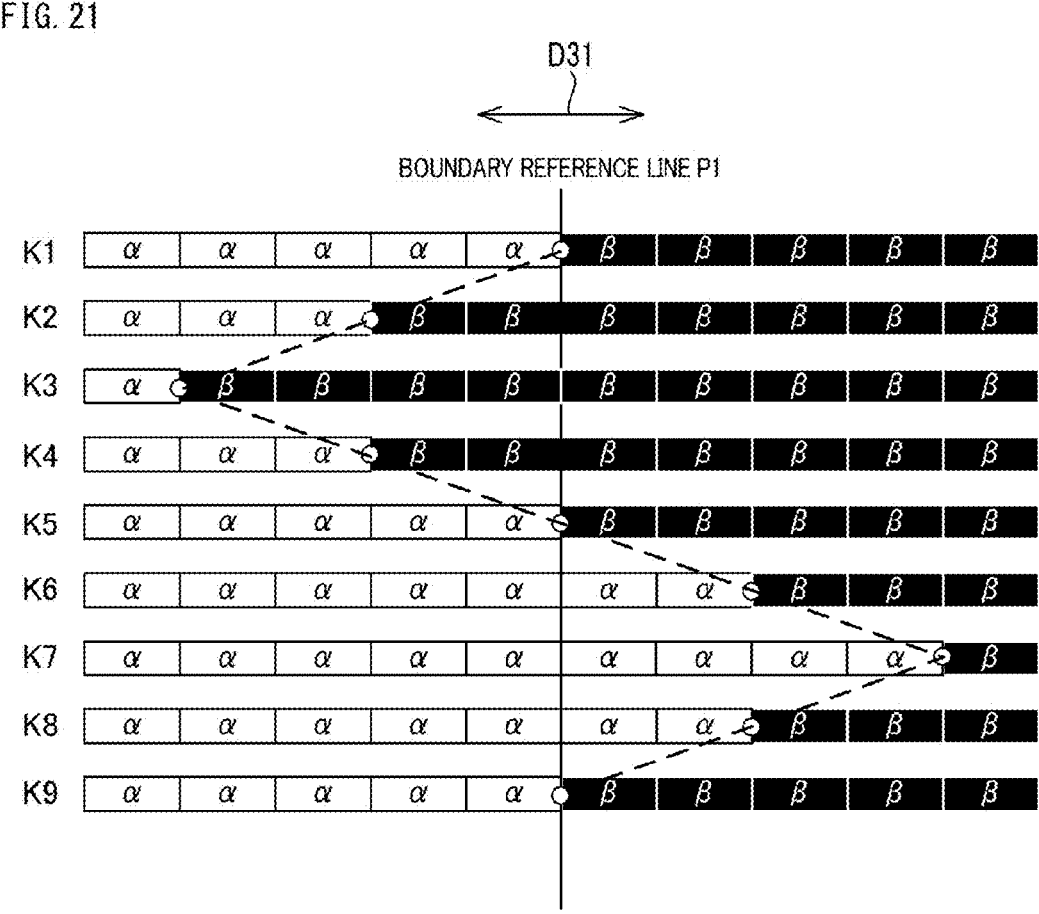
FIG. 21 is a diagram showing an example of displacement of boundary positions between block areas defined on the scanned surface.
Figure 22:
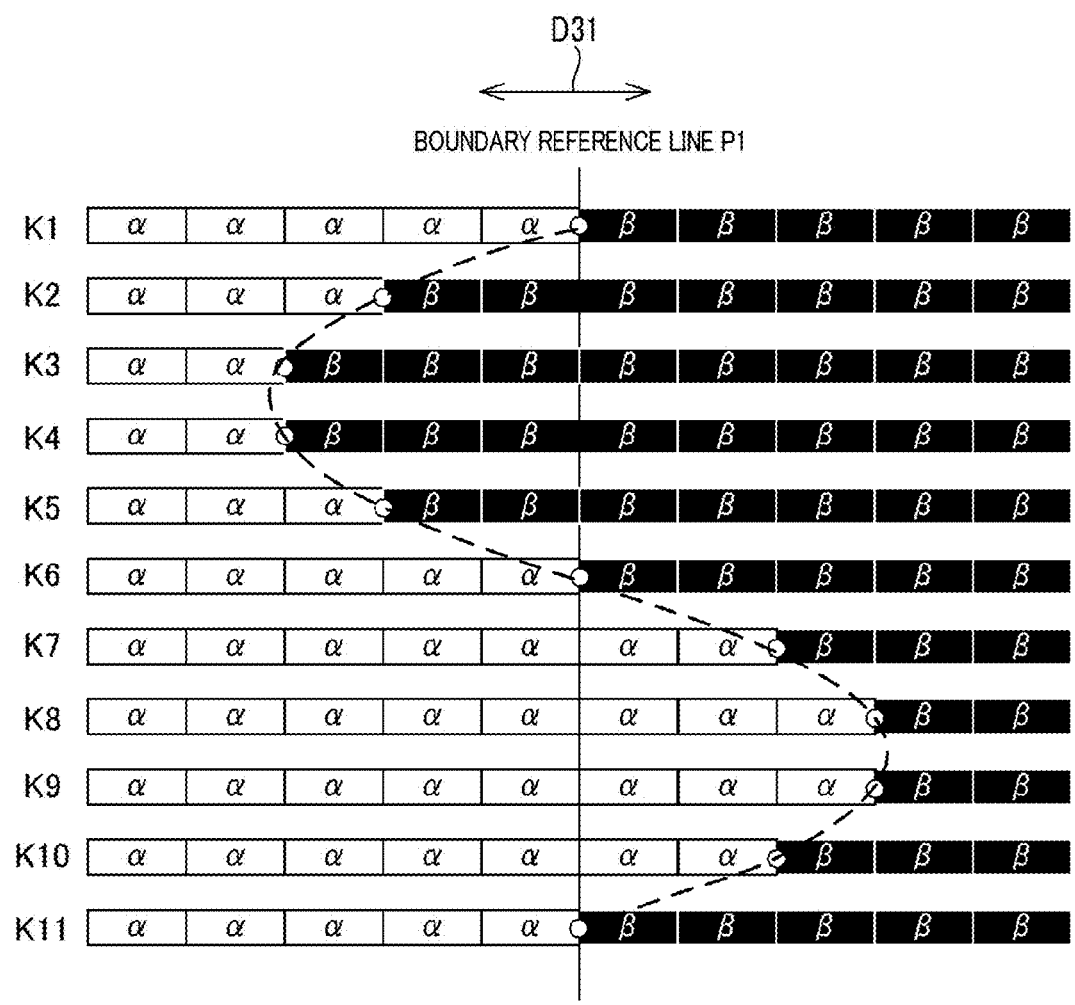
FIG. 22 is a diagram showing an example of displacement of boundary positions between block areas defined on the scanned surface.

The block position setting portion 83 changes the positions of the block areas in accordance with the cycle information of the triangular wave or the sinusoidal wave stored in the storage portion 82. For example, a boundary reference line P1 is set as a straight line (a straight line extending in the sub scanning direction) that passes the boundary between the block area B1 and the block area B2 in line K1 as shown in FIG. 20. In this case, the block position setting portion 83 cyclically performs shifting of positions of the block areas including the block areas B1 and B2 in the main scanning direction D31, on the basis of the boundary reference line P1. This causes shifting of the boundary between the block areas B1 and B2 in the main scanning direction D31 to be performed cyclically. FIG. 20 shows a state where shifting of the boundary position is performed at a cycle that includes scanning seven lines from line K1 to line K7 by light beams. In addition, FIG. 21 shows a trajectory of shifting (represented by the dotted line) when the shifting is performed such that the boundary positions connected in the sub scanning direction trace the triangular wave stored in the storage portion 82. FIG. 22 shows a trajectory of shift (represented by the dotted line) when the shifting is performed such that the boundary positions connected in the sub scanning direction trace the sinusoidal wave stored in the storage portion 82. It is noted that in FIG. 20 to FIG. 22, signs a and 8 represent pixel areas that are corrected in different ways.

In the present embodiment, the cycle information is defined to satisfy the following conditions. Specifically, the cycle information is defined such that the cycle at which the block position setting portion 83 shifts the position of the block areas (namely, boundary position), does not synchronize with at least one of the screen pattern cycle, the deflection cycle of the MEMS mirror (oscillation cycle of the sinusoidal oscillation), and the cycle of the light wave of the light beam emitted by the light source 61. Here, the screen pattern refers to a screen pattern used in the screen processing performed on the image data used in image formation, and the cycle of the screen pattern is a cycle at which the screen pattern appears in the sub scanning direction perpendicular to the main scanning direction D31. If the position of block areas is shifted at a cycle that does not synchronize with the screen pattern cycle, the screen pattern and a boundary image appearing at a boundary due to the image density difference are prevented from synchronizing with each other and appearing in a shape of wave. In addition, if the position of block areas is shifted in a cycle that does not synchronize with the deflection cycle or the cycle of the light wave of the light beam, the boundary images appearing at boundaries due to the image density difference are prevented from appearing in a shape of wave.

Each of the above-described image forming units 1 to 4 includes the charging portion 32 and the developing portion 33. When the charging portion 32 (charging device) applies a bias voltage having an AC component for charging the photoconductor drum 31 to a predetermined potential, the cycle information preferably does not synchronize with the AC component of the charging portion 32. In this case, too, the boundary images appearing at boundaries due to the image density difference are prevented from appearing in a shape of wave.

Figure 23:
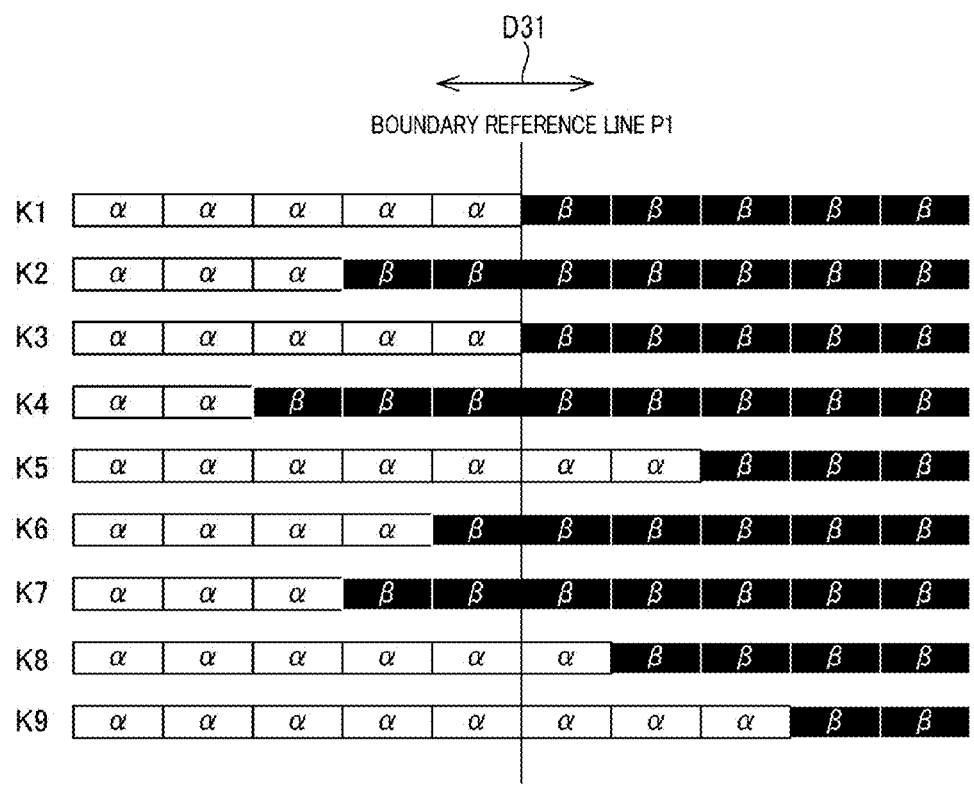
FIG. 23 is a diagram showing an example of displacement of boundary positions between block areas defined on the scanned surface.

It is noted that, according to the present embodiment, as one example, the block position setting portion 83 sets the positions of the block areas in accordance with the cycle information of the triangular wave or the sinusoidal wave stored in the storage portion 82. However, not limited to this, for example, as shown in FIG. 23, it is sufficient if the position of block areas is shifted in the main scanning direction D31 for each line, not cyclically.

In addition, according to the present embodiment, as one example, the block position setting portion 83 sets the positions of the block areas for each line. However, not limited to this, for example, the positions of the block areas may be changed for each two lines or each three lines.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A laser scanning device comprising:
   a light source configured to emit a light beam;
   a deflection portion configured to cause the light beam emitted from the light source to scan a scanned surface one line by one line by deflecting the light beam at a predetermined deflection angle;
   an image forming lens configured to condense the light beam deflected by the deflection portion on the scanned surface, and cause the light beam to be scanned on the scanned surface in a scanning direction at an equal speed;
   a block position setting portion configured to set one or more block areas which each include a plurality of section areas sectioned from each other on the scanned surface in the scanning direction; and
   a light source control portion configured to control the light source to irradiate the light beam to the plurality of section areas at a plurality of irradiation timings that are determined for each of the block areas set by the block position setting portion, wherein
   the block position setting portion shifts set positions of the block areas along the scanning direction for each scan of at least one line.

2. The laser scanning device according to claim 1, wherein
   the block position setting portion cyclically shifts the set positions of the block areas on the basis of a boundary reference line that extends in a perpendicular direction perpendicular to the scanning direction.

3. The laser scanning device according to claim 2, wherein
   a cycle at which the set positions of the block areas are shifted by the block position setting portion in the perpendicular direction, does not synchronize with at least one of: a cycle at which a screen pattern used in a screen processing performed on image data used in image formation appears in the perpendicular direction; a cycle at which the deflection portion deflects the light beam; and a cycle of the light beam.

4. The laser scanning device according to claim 2, wherein
   the block position setting portion changes the set positions of the block areas along a triangular wave or a sinusoidal wave that oscillates in the scanning direction.

5. The laser scanning device according to claim 1, wherein
   the plurality of irradiation timings are determined such that the plurality of section areas on the scanned surface have approximately an equal light quantity distribution of light flux.

6. The laser scanning device according to claim 1, wherein
   the light source control portion controls the light source such that a light beam of an exposure time period and a light intensity that correspond to positions of the block areas in the scanning direction, is irradiated to the plurality of section areas at the irradiation timings.

7. The laser scanning device according to claim 1, wherein
the deflection portion is an oscillation mirror that sinusoidally oscillates at the predetermined deflection angle and reflects the light beam toward the scanned surface, and
the image forming lens has an arc sine property that causes the light beam to move on the scanned surface in the scanning direction at an equal speed.

8. The laser scanning device according to claim 1, further comprising:
a storage portion storing beam data that includes reference spot diameters of the respective plurality of section areas, the reference spot diameters being spot diameters of a reference light beam that appear in the section areas respectively when the reference light beam having a predetermined light energy is irradiated to each of the section areas, wherein
the light source control portion controls the light source to irradiate the light beam to the plurality of section areas at the plurality of irradiation timings that are determined based on positions of the block areas in the scanning direction and the reference spot diameters of the section areas in the block areas included in the beam data.

9. The laser scanning device according to claim 8, wherein
the light source control portion adjusts intervals between the plurality of irradiation timings so that there exists a negative correlation between the intervals and sizes of the reference spot diameters included in the beam data.

10. The laser scanning device according to claim 1, wherein
irradiation positions of the light beam irradiated at the plurality of irradiation timings are located symmetrical with respect to a center position of each of the plurality of section areas.

11. The laser scanning device according to claim 1, wherein
the plurality of irradiation timings for each of the plurality of section areas are at least three times.

12. The laser scanning device according to claim 11, wherein
the plurality of irradiation timings for each of the plurality of section areas have equal intervals therebetween.

13. The laser scanning device according to claim 11, wherein
the light source control portion controls the light source such that, in each of the plurality of section areas, a light beam having a larger light energy is irradiated to an inner irradiation position located inner than an outer irradiation position that is located outermost in the scanning direction.

14. The laser scanning device according to claim 13, wherein
the light source control portion controls the light source such that a light beam having a light energy twice that of a light beam irradiated to the outer irradiation position, is irradiated to the inner irradiation position.

15. An image forming apparatus comprising:
the laser scanning device according to claim 1; and
an image forming portion configured to form, on a transferred sheet, an image based on an electrostatic latent image on a scanned surface scanned by the laser scanning device.

16. The image forming apparatus according to claim 15, wherein
each of the plurality of section areas is a pixel area corresponding to a pixel which is the smallest unit of the image formed by the image forming portion.

17. The image forming apparatus according to claim 15, wherein
the image forming portion includes a developing device and a charging device, and
a cycle at which the set positions of the block areas are shifted by the block position setting portion does not synchronize with a cycle of an AC component of a bias voltage used in the developing device, or a cycle of an AC component of a bias voltage used in the charging device.

* * * * *